United States Patent
Huang et al.

(10) Patent No.: US 10,395,089 B2
(45) Date of Patent: Aug. 27, 2019

(54) APPLICATION AND PICTURE DISPLAY VERIFICATION METHODS, APPARATUSES, AND ELECTRONIC DEVICE

(71) Applicant: Huawei Technologies Co., Ltd., Shenzhen (CN)

(72) Inventors: Xi Huang, Shenzhen (CN); Huangwei Wu, Shenzhen (CN); Jiejing Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 53 days.

(21) Appl. No.: 15/550,879

(22) PCT Filed: Feb. 15, 2015

(86) PCT No.: PCT/CN2015/073095
§ 371 (c)(1),
(2) Date: Aug. 14, 2017

(87) PCT Pub. No.: WO2016/127426
PCT Pub. Date: Aug. 18, 2016

(65) Prior Publication Data
US 2018/0046844 A1 Feb. 15, 2018

(51) Int. Cl.
*G06K 9/00* (2006.01)
*G06F 21/32* (2013.01)
*G06F 3/041* (2006.01)

(52) U.S. Cl.
CPC ......... *G06K 9/00087* (2013.01); *G06F 3/041* (2013.01); *G06F 21/32* (2013.01); *G06K 9/00013* (2013.01)

(58) Field of Classification Search
CPC ...... G06F 21/36; G06F 21/32; G06F 21/6218; G06F 3/041; G06K 9/00892;
(Continued)

(56) References Cited

U.S. PATENT DOCUMENTS

2013/0014249 A1 1/2013 Hassan et al.
2014/0043255 A1 2/2014 Liu et al.
(Continued)

FOREIGN PATENT DOCUMENTS

CN 101809581 A 8/2010
CN 102760033 A 10/2012
(Continued)

OTHER PUBLICATIONS

Machine Translation and Abstract of Chinese Publication No. CN103164264, Jun. 19, 2013, 18 pages.
(Continued)

*Primary Examiner* — Amir Alavi
(74) *Attorney, Agent, or Firm* — Conley Rose, P.C.

(57) ABSTRACT

An application display method of the present disclosure includes receiving a touch operation, obtaining second fingerprint information from the touch operation, matching the second fingerprint information and first fingerprint information, and when the second fingerprint information matches the first fingerprint information, displaying a first application in an application switch screen. The picture display method of the present disclosure includes receiving a touch operation, obtaining second fingerprint information from the touch operation, matching the second fingerprint information and first fingerprint information, and when the second fingerprint information matches the first fingerprint information, displaying a second picture. Hence, the methods provided can be applicable to a scenario in which an electronic device displays an application or a picture that may include private information of a user.

17 Claims, 22 Drawing Sheets

(58) Field of Classification Search
CPC ........... G06K 9/00087; G06K 9/00288; G06K 9/00013; H04N 7/181; G06T 7/004
See application file for complete search history.

(56) References Cited

U.S. PATENT DOCUMENTS

| | | | |
|---|---|---|---|
| 2014/0140587 A1 | 5/2014 | Ballard et al. | |
| 2014/0230049 A1 | 8/2014 | Fadell et al. | |
| 2014/0292666 A1 | 10/2014 | Shi et al. | |
| 2015/0047017 A1* | 2/2015 | Kim | G06F 21/32 726/19 |
| 2015/0047019 A1 | 2/2015 | Dong | |
| 2015/0089631 A1 | 3/2015 | Bao et al. | |
| 2015/0135108 A1* | 5/2015 | Pope | G06K 9/00006 715/767 |
| 2015/0199553 A1* | 7/2015 | Kim | G06F 3/0416 348/77 |
| 2015/0294172 A1* | 10/2015 | Aoki | G06K 9/00892 348/77 |
| 2017/0213019 A1* | 7/2017 | Mao | G06F 21/32 |
| 2017/0293750 A1* | 10/2017 | Lee | G06F 21/32 |
| 2017/0308732 A1* | 10/2017 | Wang | G06F 3/0488 |
| 2017/0372091 A1* | 12/2017 | Lacey | G06F 17/30011 |
| 2017/0373844 A1* | 12/2017 | Sykora | H04L 9/0861 |
| 2018/0046844 A1* | 2/2018 | Huang | G06F 21/32 |
| 2018/0144111 A1* | 5/2018 | Katingari | G06F 3/0416 |

FOREIGN PATENT DOCUMENTS

| | | |
|---|---|---|
| CN | 102855063 A | 1/2013 |
| CN | 103164264 A | 6/2013 |
| CN | 103425914 A | 12/2013 |
| CN | 103488924 A | 1/2014 |
| CN | 103577739 A | 2/2014 |
| CN | 103824011 A | 5/2014 |
| EP | 2731037 A1 | 5/2014 |

OTHER PUBLICATIONS

Machine Translation and Abstract of Chinese Publication No. CN103425914, Dec. 4, 2013, 22 pages.
Machine Translation and Abstract of Chinese Publication No. CN103577739, Feb. 12, 2014, 24 pages.
Machine Translation and Abstract of Chinese Publication No. CN103824011, May 28, 2014, 24 pages.
Foreign Communication From a Counterpart Application, PCT Application No. PCT/CN2015/073095, English Translation of International Search Report dated Oct. 29, 2015, 2 pages.
Foreign Communication From a Counterpart Application, PCT Application No. PCT/CN2015/073095, English Translation of Written Opinion dated Oct. 29, 2015, 5 pages.
Foreign Communication From a Counterpart Application, European Application No. 15881588.6, Extended European Search Report dated Dec. 22, 2017, 7 pages.
Machine Translation and Abstract of Chinese Publication No. CN102760033, Jan. 2, 2013, 13 pages.
Foreign Communication From a Counterpart Application, Chinese Application No. 201580002456.4, Chinese Office Action dated Jun. 12, 2018, 8 pages.

\* cited by examiner

APPLICATION AND PICTURE DISPLAY VERIFICATION METHODS, APPARATUSES, AND ELECTRONIC DEVICE

CROSS-REFERENCE TO RELATED APPLICATIONS

This application is a U.S. National Stage of International Patent Application No. PCT/CN2015/073095 filed on Feb. 15, 2015, which is hereby incorporated by reference in its entirety.

TECHNICAL FIELD

The present disclosure relates to the field of electronic information technologies, and in particular, to application and picture display methods and apparatuses, and an electronic device.

BACKGROUND

Currently, as functions of electronic devices become increasingly powerful, more functional applications are installed in electronic devices. To help a user easily view a recently run application or a picture in an electronic device, the electronic device may display a screenshot of the recently run application or the picture in the electronic device according to an operation of the user. The application or picture is, for example, an album picture or a browser page.

However, a screen capture of a recently run application or a picture in an electronic device usually includes private information of an owner user of the electronic device. The electronic device also displays a screenshot of a recently run application or a picture that includes the private information of the owner user of the electronic device when the electronic device is used by a user other than the owner user, resulting in a leakage of the private information of the owner user, which increases an information security risk of the electronic device.

SUMMARY

Embodiments of the present disclosure provide application and picture display methods and apparatuses, and an electronic device in order to avoid a leakage of private information of an owner user, and reduce an information security risk of an electronic device.

To achieve the foregoing objective, the following technical solutions are used in the embodiments of the present disclosure.

According to a first aspect, an embodiment of the present disclosure provides an application display method, applied to an electronic device. First fingerprint information is stored in the electronic device, a first application is installed in the electronic device, verification against the first fingerprint information needs to be performed to run the first application, and the method includes receiving a touch operation, where the touch operation is used to request to display an application switch screen, obtaining second fingerprint information from the touch operation, matching the second fingerprint information and the first fingerprint information, and displaying the first application in the application switch screen when the second fingerprint information matches the first fingerprint information.

With reference to the first aspect, in a first possible implementation manner, the method further includes displaying, in the application switch screen, a second application and/or the first application on which blurring processing is performed when the second fingerprint information does not match the first fingerprint information, where verification against the first fingerprint information does not need to be performed to run the second application.

With reference to the first aspect or the first possible implementation manner of the first aspect, in a second possible implementation manner, displaying the first application in the application switch screen includes displaying a screen thumbnail of the first application and/or basic information of the first application in the application switch screen.

With reference to the first aspect, in a third possible implementation manner, when at least two pieces of fingerprint information are obtained from the touch operation, obtaining second fingerprint information from the touch operation includes using, as the second fingerprint information, both the at least two pieces of fingerprint information obtained from the touch operation, using, as the second fingerprint information, either of the at least two pieces of fingerprint information obtained from the touch operation, using fingerprint information, obtained from the touch operation, of a recognized finger that earliest comes into contact with the electronic device as the second fingerprint information, using fingerprint information, obtained from the touch operation, of a recognized finger that latest comes into contact with the electronic device as the second fingerprint information, using fingerprint information, obtained from the touch operation, of a recognized finger that has a maximum area of contact with the electronic device as the second fingerprint information, using fingerprint information, obtained from the touch operation, of a recognized finger that has a minimum area of contact with the electronic device as the second fingerprint information, or obtaining a contact moment, a contact area, and an integrity parameter that correspond to fingerprint information obtained from the touch operation, where the contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information, and determining the second fingerprint information according to the contact moment, the contact area, and the integrity parameter.

With reference to the first aspect, in a fourth possible implementation manner, before receiving a touch operation, the method includes receiving a selection instruction of a user, and selecting at least one application as the first application according to the selection instruction.

According to a second aspect, an embodiment of the present disclosure provides a picture display method, applied to an electronic device, where first fingerprint information is stored in the electronic device, a first picture and a second picture are stored in the electronic device, the electronic device currently displays the first picture, verification against the first fingerprint information needs to be performed to view the second picture, and the method includes receiving a touch operation, where the touch operation is used to request to display the second picture, obtaining second fingerprint information from the touch operation, matching the second fingerprint information and the first fingerprint information, and displaying the second picture when the second fingerprint information matches the first fingerprint information.

With reference to the second aspect, in a first possible implementation manner, the method further includes displaying a third picture and/or the second picture on which blurring processing is performed when the second fingerprint information does not match the first fingerprint information, where verification against the first fingerprint information does not need to be performed to perform an operation of viewing the third picture.

With reference to the second aspect or the first possible implementation manner of the second aspect, in a second possible implementation manner, displaying the second picture includes displaying the second picture and/or basic information of the second picture.

With reference to the second aspect, in a third possible implementation manner, when at least two pieces of fingerprint information are obtained from the touch operation, obtaining second fingerprint information from the touch operation includes using, as the second fingerprint information, both the at least two pieces of fingerprint information obtained from the touch operation, using, as the second fingerprint information, either of the at least two pieces of fingerprint information obtained from the touch operation, using fingerprint information, obtained from the touch operation, of a recognized finger that earliest comes into contact with the electronic device as the second fingerprint information, using fingerprint information, obtained from the touch operation, of a recognized finger that latest comes into contact with the electronic device as the second fingerprint information, using fingerprint information, obtained from the touch operation, of a recognized finger that has a maximum area of contact with the electronic device as the second fingerprint information, using fingerprint information, obtained from the touch operation, of a recognized finger that has a minimum area of contact with the electronic device as the second fingerprint information, or obtaining a contact moment, a contact area, and an integrity parameter that correspond to fingerprint information obtained from the touch operation, where the contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information, and determining the second fingerprint information according to the contact moment, the contact area, and the integrity parameter.

With reference to the second aspect, in a fourth possible implementation manner, before the receiving a touch operation, the method includes receiving a selection instruction of a user, and selecting at least one picture as the second picture according to the selection instruction, or setting a target photographing function icon, and using, a picture obtained through photographing using the target photographing function icon, as the second picture.

According to a third aspect, an embodiment of the present disclosure provides an application display apparatus, where first fingerprint information is stored in the apparatus, a first application is installed in the apparatus, verification against the first fingerprint information needs to be performed to run the first application, and the apparatus includes a receiving module configured to receive a touch operation, where the touch operation is used to request to display an application switch screen, an obtaining module configured to obtain second fingerprint information from the touch operation, a matching module configured to match the second fingerprint information and the first fingerprint information, and a first display module configured to display the first application in the application switch screen when the second fingerprint information matches the first fingerprint information.

With reference to the third aspect, in a first possible implementation manner, the apparatus further includes a second display module configured to display, in the application switch screen, a second application and/or the first application on which blurring processing is performed when the second fingerprint information does not match the first fingerprint information, where verification against the first fingerprint information does not need to be performed to run the second application.

With reference to the third aspect or the first possible implementation manner of the third aspect, in a second possible implementation manner, the first display module includes a display submodule configured to display a screen thumbnail of the first application and/or basic information of the first application in the application switch screen.

With reference to the third aspect, in a third possible implementation manner, the obtaining module includes a first obtaining submodule configured to use, as the second fingerprint information, both the at least two pieces of fingerprint information obtained from the touch operation, a second obtaining submodule configured to use, as the second fingerprint information, either of the at least two pieces of fingerprint information obtained from the touch operation, a third obtaining submodule configured to use fingerprint information, obtained from the touch operation, of a recognized finger that earliest comes into contact with the apparatus as the second fingerprint information, a fourth obtaining submodule configured to use fingerprint information, obtained from the touch operation, of a recognized finger that latest comes into contact with the apparatus as the second fingerprint information, a fifth obtaining submodule configured to use fingerprint information, obtained from the touch operation, of a recognized finger that has a maximum area of contact with the apparatus as the second fingerprint information, a sixth obtaining submodule configured to use fingerprint information, obtained from the touch operation, of a recognized finger that has a minimum area of contact with the apparatus as the second fingerprint information, or a seventh obtaining submodule configured to obtain a contact moment, a contact area, and an integrity parameter that correspond to fingerprint information obtained from the touch operation, where the contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information, and a determining submodule configured to determine the second fingerprint information according to the contact moment, the contact area, and the integrity parameter.

With reference to the third aspect, in a fourth possible implementation manner, the apparatus further includes an instruction receiving module configured to receive a selection instruction of a user, and a selection module configured to select at least one application as the first application according to the selection instruction.

According to a fourth aspect, an embodiment of the present disclosure provides a picture display apparatus, where first fingerprint information is stored in the apparatus, a first picture and a second picture are stored in the apparatus, the apparatus currently displays the first picture, verification against the first fingerprint information needs to be performed to view the second picture, and the apparatus includes a receiving module configured to receive a touch operation, where the touch operation is used to request to display the second picture, an obtaining module configured to obtain second fingerprint information from the touch operation, a matching module configured to match the second fingerprint information and the first fingerprint information, and a first display module configured to display the second picture when the second fingerprint information matches the first fingerprint information.

With reference to the fourth aspect, in a first possible implementation manner, the apparatus further includes a second display module configured to display a third picture and/or the second picture on which blurring processing is performed when the second fingerprint information does not match the first fingerprint information, where verification against the first fingerprint information does not need to be performed to perform an operation of viewing the third picture.

With reference to the fourth aspect or the first possible implementation manner of the fourth aspect, in a second possible implementation manner, the first display module includes a display submodule configured to display the second picture and/or basic information of the second picture.

With reference to the fourth aspect, in a third possible implementation manner, the obtaining module includes a first obtaining submodule configured to use, as the second fingerprint information, both the at least two pieces of fingerprint information obtained from the touch operation, a second obtaining submodule configured to use, as the second fingerprint information, either of the at least two pieces of fingerprint information obtained from the touch operation, a third obtaining submodule configured to use fingerprint information, obtained from the touch operation, of a recognized finger that earliest comes into contact with the apparatus as the second fingerprint information, a fourth obtaining submodule configured to use fingerprint information, obtained from the touch operation, of a recognized finger that latest comes into contact with the apparatus as the second fingerprint information, a fifth obtaining submodule configured to use fingerprint information, obtained from the touch operation, of a recognized finger that has a maximum area of contact with the apparatus as the second fingerprint information, a sixth obtaining submodule configured to use fingerprint information, obtained from the touch operation, of a recognized finger that has a minimum area of contact with the apparatus as the second fingerprint information, or a seventh obtaining submodule configured to obtain a contact moment, a contact area, and an integrity parameter that correspond to fingerprint information obtained from the touch operation, where the contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information, and a determining submodule configured to determine the second fingerprint information according to the contact moment, the contact area, and the integrity parameter.

With reference to the fourth aspect, in a fourth possible implementation manner, the apparatus further includes an instruction receiving module configured to receive a selection instruction of a user, and a selection module configured to select at least one picture as the second picture according to the selection instruction, or a setting module configured to set a target photographing function icon, and use, a picture obtained through photographing using the target photographing function icon, as the second picture.

According to a fifth aspect, an embodiment of the present disclosure provides an electronic device, first fingerprint information is stored in the electronic device, a first application is installed in the electronic device, verification against the first fingerprint information needs to be performed to run the first application, and the electronic device at least includes an input unit, a processing unit, and an output unit, where the input unit is configured to receive a touch operation, where the touch operation is used to request to display an application switch screen. The processing unit is configured to obtain second fingerprint information from the touch operation, and is configured to match the second fingerprint information and the first fingerprint information, and the output unit is configured to display the first application in the application switch screen when the second fingerprint information matches the first fingerprint information.

With reference to the fifth aspect, in a first possible implementation manner, the output unit is further configured to display, in the application switch screen, a second application and/or the first application on which blurring processing is performed when the second fingerprint information does not match the first fingerprint information, where verification against the first fingerprint information does not need to be performed to run the second application.

With reference to the fifth aspect or the first possible implementation manner of the fifth aspect, in a second possible implementation manner, the output unit is further configured to display a screen thumbnail of the first application and/or basic information of the first application in the application switch screen.

With reference to the fifth aspect, in a third possible implementation manner, the processing unit is further configured to use, as the second fingerprint information, both the at least two pieces of fingerprint information obtained from the touch operation, use, as the second fingerprint information, either of the at least two pieces of fingerprint information obtained from the touch operation, use fingerprint information, obtained from the touch operation, of a recognized finger that earliest comes into contact with the electronic device as the second fingerprint information, use fingerprint information, obtained from the touch operation, of a recognized finger that latest comes into contact with the electronic device as the second fingerprint information, use fingerprint information, obtained from the touch operation, of a recognized finger that has a maximum area of contact with the electronic device as the second fingerprint information, use fingerprint information, obtained from the touch operation, of a recognized finger that has a minimum area of contact with the electronic device as the second fingerprint information, or obtain a contact moment, a contact area, and an integrity parameter that correspond to fingerprint information obtained from the touch operation, where the contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information, and determine the second fingerprint information according to the contact moment, the contact area, and the integrity parameter.

With reference to the fifth aspect, in a fourth possible implementation manner, the input unit is further configured to receive a selection instruction of a user, and the processing unit is further configured to select at least one application as the first application according to the selection instruction.

According to a sixth aspect, an embodiment of the present disclosure provides an electronic device, first fingerprint information is stored in the electronic device, a first picture and a second picture are stored in the electronic device, the electronic device currently displays the first picture, verification against the first fingerprint information needs to be performed to view the second picture, and the electronic device at least includes an input unit, a processing unit, and an output unit, where the input unit is configured to receive a touch operation, where the touch operation is used to request to display the second picture, the processing unit is configured to obtain second fingerprint information from the touch operation, and is configured to match the second fingerprint information and the first fingerprint information, the output unit is configured to display the second picture when the second fingerprint information matches the first fingerprint information.

With reference to the sixth aspect, in a first possible implementation manner, the output unit is further configured to display a third picture and/or the second picture on which blurring processing is performed when the second fingerprint information does not match the first fingerprint information, where verification against the first fingerprint information does not need to be performed to perform an operation of viewing the third picture.

With reference to the sixth aspect or the first possible implementation manner of the sixth aspect, in a second possible implementation manner, the output unit further includes displaying the second picture and/or basic information of the second picture.

With reference to the sixth aspect, in a third possible implementation manner, the processing unit is further configured to use, as the second fingerprint information, both the at least two pieces of fingerprint information obtained from the touch operation, use, as the second fingerprint information, either of the at least two pieces of fingerprint information obtained from the touch operation, use fingerprint information, obtained from the touch operation, of a recognized finger that earliest comes into contact with the electronic device as the second fingerprint information, use fingerprint information, obtained from the touch operation, of a recognized finger that latest comes into contact with the electronic device as the second fingerprint information, use fingerprint information, obtained from the touch operation, of a recognized finger that has a maximum area of contact with the electronic device as the second fingerprint information, use fingerprint information, obtained from the touch operation, of a recognized finger that has a minimum area of contact with the electronic device as the second fingerprint information, or obtain a contact moment, a contact area, and an integrity parameter that correspond to fingerprint information obtained from the touch operation, where the contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information, and determine the second fingerprint information according to the contact moment, the contact area, and the integrity parameter.

With reference to the sixth aspect, in a fourth possible implementation manner, the input unit is further configured to receive a selection instruction of a user, and the processing unit is further configured to select at least one picture as the second picture according to the selection instruction, or the processing unit is further configured to set a target photographing function icon, and use, a picture obtained through photographing using the target photographing function icon, as the second picture.

For the application display method and apparatus and the electronic device provided in the embodiments of the present disclosure, an electronic device can match second fingerprint information obtained from a touch operation and preset first fingerprint information of an owner user, where a first application can be run when verification against the first fingerprint information is performed, and the electronic device determines, according to a matching result, whether to display the first application, when the second fingerprint information matches the first fingerprint information, the electronic device determines that the touch operation has a permission to display the first application. In this way, a case in which an application that includes private information of an owner user of an electronic device may be displayed when the electronic device accepts a touch operation of any user is avoided, thereby avoiding a leakage of the private information of the owner user, and reducing an information security risk of the electronic device.

For the picture display method and apparatus and the electronic device provided in the embodiments of the present disclosure, in a scenario in which an electronic device can currently display a first picture, the electronic device matches second fingerprint information obtained from a touch operation and preset first fingerprint information of an owner user, where a second picture can be displayed when verification against the first fingerprint information is performed, and the electronic device determines, according to a matching result, whether to display the second picture, when the second fingerprint information matches the first fingerprint information, the electronic device determines that the touch operation has a permission to switch display of the first picture to display of the second picture. In this way, a case in which a picture that includes private information of an owner user of an electronic device may be displayed when the electronic device accepts a touch operation of any user is avoided, thereby avoiding a leakage of the private information of the owner user, and reducing an information security risk of the electronic device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiment. The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The technical solutions provided in the embodiments of the present disclosure are applied to an electronic device. In the embodiments of the present disclosure, the electronic device may be a device, such as a mobile telephone, a mobile computer, a tablet computer, a personal digital assistant (PDA), a media player, a smart television, a smart watch, smart glasses, or a smart wristband. This is not limited herein. In a process in which the electronic device interacts with a user by means of an operation of the user, the electronic device may determine a permission of a touch operation of the user according to fingerprint information obtained from the touch operation of the user and preset fingerprint information, thereby protecting private information of an owner user. The fingerprint information may also be replaced with information, such as palm print information or iris information, that can be used to recognize a user.

It should be noted that the terms used in the embodiments of the present disclosure are merely for the purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items.

It should be understood that although the terms "first," "second," "third," and the like may be used in the embodiments of the present disclosure to describe various fingerprint information, applications, pictures, modules, and units, the fingerprint information, applications, pictures, modules, and units should not be limited to these terms. These terms are merely used to distinguish fingerprint information, applications, pictures, modules, and units from each other.

Figure 1:
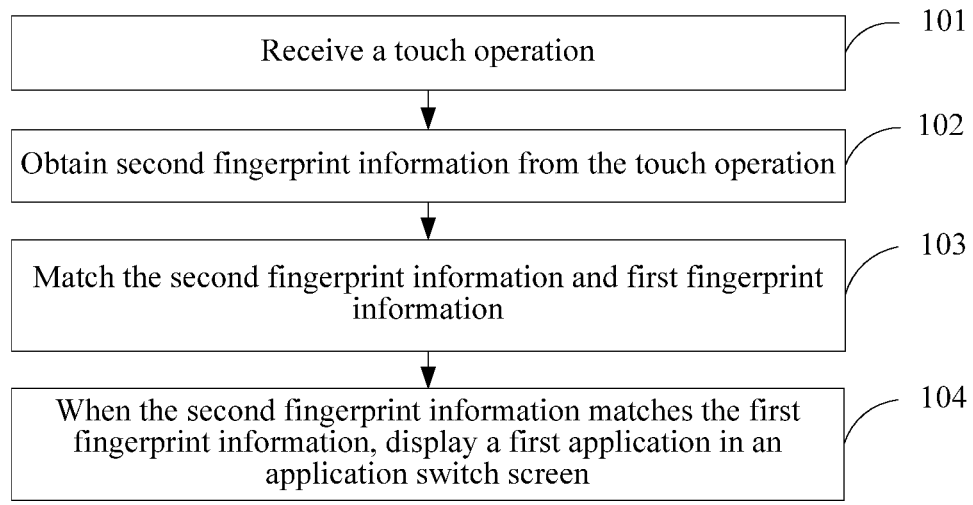
FIG. 1 is a flowchart of an application display method according to an embodiment of the present disclosure.

An embodiment of the present disclosure provides an application display method, applied to an electronic device. First fingerprint information is stored in the electronic device, and a first application is installed in the electronic device. Verification against the first fingerprint information needs to be performed to run the first application. For example, when fingerprint information A used during verification is not the first fingerprint information, the fingerprint information A does not have a permission to run the first application. It should be noted that there may be one or more first applications. As shown in FIG. 1, the application display method in this embodiment of the present disclosure includes the following steps.

Step 101: Receive a touch operation.

The touch operation is used to request to display an application switch screen. The application switch screen includes a screen thumbnail of an application that is running in the electronic device within a preset period of time, or some basic information of an application that is running in the electronic device. The basic information is information such as a name, a developer, a previous start time, a previous exit time, a size of occupied memory, and used network traffic.

In this embodiment of the present disclosure, the electronic device has a touch screen, and a fingerprint sensor is disposed on the electronic device, and can obtain fingerprint information from a touch operation of a user on the touch screen of the electronic device. The fingerprint sensor may be a capacitive fingerprint sensor, an ultrasonic fingerprint sensor, an optical fingerprint sensor, a temperature fingerprint sensor, a swipe-type fingerprint sensor, a pressure-sensitive fingerprint sensor, or the like. It should be noted that, in this embodiment of the present disclosure, a specific manner and type of the touch operation are not limited. In different operating systems, the touch operation may be different operations. For example, the electronic device displays a multi-task key icon, and the touch operation is an operation of tapping the multi-task key icon. Alternatively, the touch operation is an operation of pressing a HOME key twice. Alternatively, the touch operation is an operation of touching and holding a back key, and the like.

Step 102: Obtain second fingerprint information from the touch operation.

The second fingerprint information is obtained from the touch operation. The second fingerprint information may be one piece of fingerprint information, or may be multiple pieces of fingerprint information. Specific content of obtaining the second fingerprint information from the touch operation is described in subsequent embodiments.

Step 103: Match the second fingerprint information and first fingerprint information.

The electronic device matches the second fingerprint information obtained from the touch operation and the first fingerprint information prestored in the electronic device. When the second fingerprint information matches the first fingerprint information, it indicates that a fingerprint of a finger corresponding to the second fingerprint information is the same as a fingerprint of a finger corresponding to the first fingerprint information, and the second fingerprint information and the first fingerprint information have a same permission. When the second fingerprint information does not match the first fingerprint information, it indicates that a fingerprint of a finger corresponding to the second fingerprint information is different from a fingerprint of a finger corresponding to the first fingerprint information, and the second fingerprint information and the first fingerprint information have different permissions.

It should be noted that, the first fingerprint information may be one piece of fingerprint information, or may include multiple pieces of fingerprint information. Verification against different first fingerprint information is performed to run different applications. One piece of first fingerprint information may correspond to one first application, or one piece of first fingerprint information may correspond to multiple first applications. For example, as shown in Table 1, verification against fingerprint information A needs to be performed to run an application a, verification against fingerprint information B needs to be performed to run an application b, verification against the fingerprint information B needs to be performed to run an application c, verification against fingerprint information C needs to be performed to run an application d.

TABLE 1

| First fingerprint information | First application |
| --- | --- |
| Fingerprint information A | Application a |
| Fingerprint information B | Application b, application c |
| Fingerprint information C | Application d |

Step 104: When the second fingerprint information matches the first fingerprint information, display a first application in an application switch screen.

When the second fingerprint information matches the first fingerprint information, the electronic device displays the first application in the application switch screen. Optionally, an application that can be directly run without needing to perform verification against the first fingerprint information may be further displayed at the same time. It should be noted that, a thumbnail of the first application, basic information of the first application, and/or the like may be displayed in the application switch screen. For example, an application A, an application B, an application C, and an application D are run in a mobile phone within a preset period of time, where the first application is the application A. When the first fingerprint information matches the second fingerprint information, the mobile phone displays a thumbnail of the application A and/or basic information of the application A in an application switch screen, or, the mobile phone displays the application A and applications other than the application A in the application switch screen, that is, displays the application A, the application B, the application C, and the application D in the application switch screen.

For the application display method provided in this embodiment of the present disclosure, an electronic device can match second fingerprint information obtained from a touch operation and preset first fingerprint information of an owner user, where a first application can be run when verification against the first fingerprint information is performed, and the electronic device determines, according to a matching result, whether to display the first application. The electronic device determines that the touch operation has a permission to display the first application when the second fingerprint information matches the first fingerprint information. In this way, a case in which an application that includes private information of an owner user of an electronic device may be displayed when the electronic device accepts a touch operation of any user is avoided, thereby avoiding a leakage of the private information of the owner user, and reducing an information security risk of the electronic device.

Figure 2:
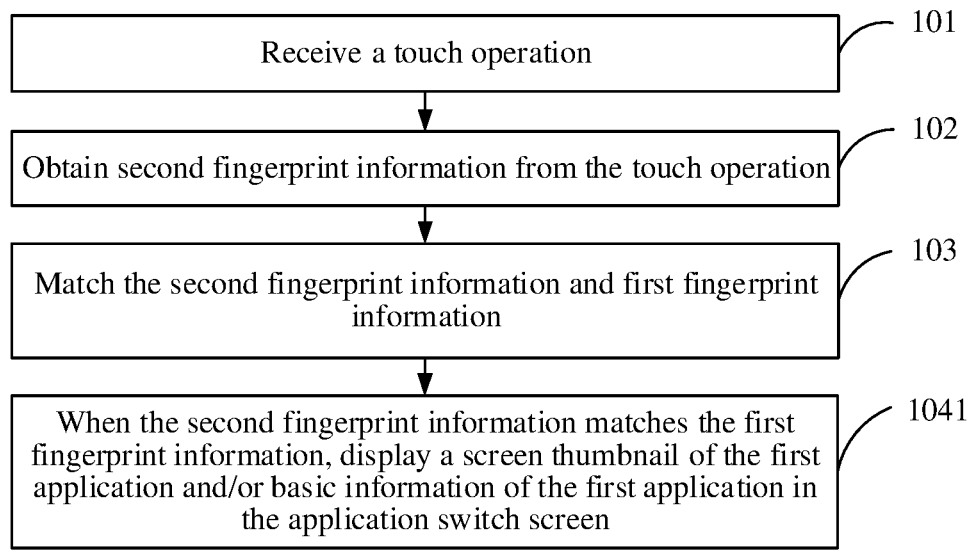
FIG. 2 is a flowchart of a specific implementation manner of an application display method according to an embodiment of the present disclosure.

Further, when the second fingerprint information matches the first fingerprint information, a manner for displaying the first application may be further detailed. On the basis of the solution shown in FIG. 1, this embodiment of the present disclosure further provides a specific solution of the application display method, to further detail a process of performing step 104 shown in FIG. 1. Step 104 may be further implemented as step 1041, and as shown in FIG. 2.

Step 1041: When the second fingerprint information matches the first fingerprint information, display a screen thumbnail of the first application and/or basic information of the first application in the application switch screen.

When the second fingerprint information matches the first fingerprint information, the screen thumbnail of the first application and/or the basic information of the first application are/is displayed in the application switch screen. Further, the screen thumbnail of the first application may be a screen thumbnail of the first application at a previous exit, or a screen thumbnail of the first application at a preset moment. The basic information may include information such as a name of the application, a developer of the application, a previous start time of the application, a previous exit time of the application, a size of memory occupied by the application, and network traffic used by the application.

For the application display method provided in this embodiment of the present disclosure, an electronic device can match second fingerprint information obtained from a touch operation and preset first fingerprint information of an owner user, where a first application can be run when verification against the first fingerprint information is performed, and the electronic device determines, according to a matching result, whether to display the first application. The electronic device determines that the touch operation has a permission to display the first application when the second fingerprint information matches the first fingerprint information. In this way, a case in which an application that includes private information of an owner user of an electronic device may be displayed when the electronic device accepts a touch operation of any user is avoided, thereby avoiding a leakage of the private information of the owner user, and reducing an information security risk of the electronic device.

Figure 3:
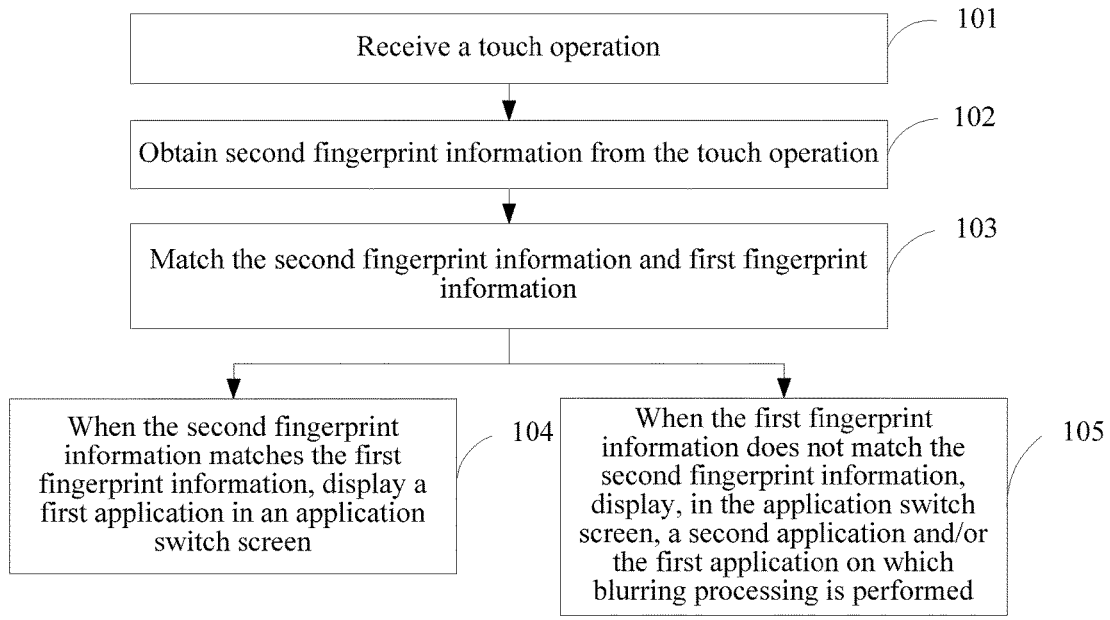
FIG. 3 is a flowchart of another specific implementation manner of an application display method according to an embodiment of the present disclosure.

In addition, when the second fingerprint information does not match the first fingerprint information, the electronic device does not display the first application, or displays the first application on which special processing is performed, for example, the first application on which blurring processing is performed. On the basis of the solution shown in FIG. 1, this embodiment of the present disclosure further provides a specific solution of the application display method. As shown in FIG. 3, the method further includes the following step.

Step 105: When the first fingerprint information does not match the second fingerprint information, display, in the application switch screen, a second application and/or the first application on which blurring processing is performed.

Verification against the first fingerprint information does not need to be performed for the electronic device to run the second application. That is, when receiving an instruction for instructing to run the second application, the electronic device may directly run the second application without needing to perform verification against the first fingerprint information. Whether the second application can be run is not related to the first fingerprint information.

When the second fingerprint information does not match the first fingerprint information, the electronic device independently displays the second application in the application switch screen, or displays the second application and the first application on which blurring processing is performed, and further, displays the screen thumbnail and/or the basic information of the first application on which blurring processing is performed such that a user currently using the electronic device cannot obtain, from content displayed by the electronic device in the application switch, information involving privacy of an owner user. For example, within a preset period of time, an application A, an application B, an application C, and an application D are run in a mobile phone, where the first application is the application A, and the second application is the application B, the application C or the application D. When the second fingerprint information does not match the first fingerprint information, the mobile phone displays thumbnails of the application B, the application C, and the application D and/or basic information of the application B, the application C, and the application D in the application switch screen, or the mobile phone displays, in the application switch screen, the application B, the application C, the application D, and the application A on which blurring processing is performed. Further, some sensitive information in the first application may be blurred to obtain a blurred first application. For example, a sender of a short message service message and content of the short message service message that are displayed in a short message application are blurred, while a time when the short message service message is received may not be blurred, or the first application on which blurring processing is performed is displayed independently.

For the application display method provided in this embodiment of the present disclosure, an electronic device can match second fingerprint information obtained from a touch operation and preset first fingerprint information of an owner user, where a first application can be run when verification against the first fingerprint information is performed, and the electronic device determines, according to a matching result, whether to display the first application, the electronic device determines that the touch operation has a permission to display the first application when the second fingerprint information matches the first fingerprint information, and when the second fingerprint information does not match the first fingerprint information, the electronic device determines that the touch operation does not have a permission to display the first application, or that the touch operation does not have a permission to display the first application clearly. In this way, a case in which an application that includes private information of an owner user of an electronic device may be displayed when the electronic device accepts a touch operation of any user is avoided, thereby avoiding a leakage of the private information of the owner user, and reducing an information security risk of the electronic device.

Further, on the basis of the solution shown in FIG. 3, when the electronic device obtains at least two pieces of fingerprint information from one touch operation, regarding how to determine the second fingerprint information in the obtained at least two pieces of fingerprint information, this embodiment of the present disclosure further provides a specific solution of the application display method. This solution further details a process of performing step 102 in the solution shown in FIG. 1. Step 102 may be further implemented as any one of the steps 1021 to 1026, or 1027*a* and 1027*b*. Steps 1021 to 1026 and 1027*a* and 1027*b* are described below separately.

Figure 4A:
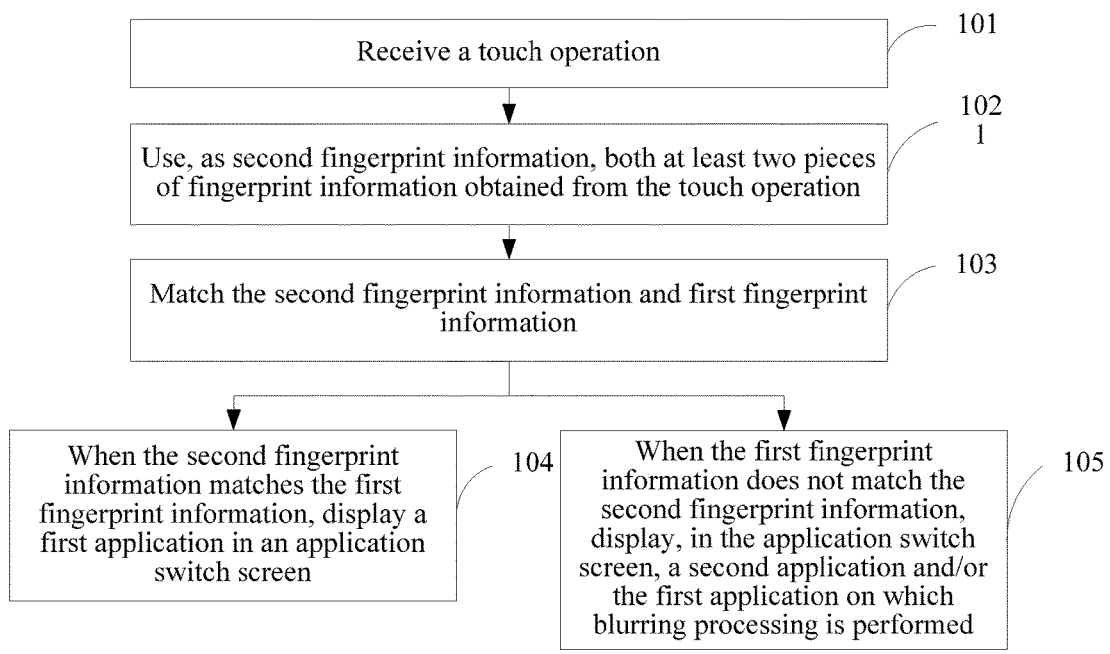
FIG. 4A, FIG. 4B, FIG. 4C, FIG. 4D, FIG. 4E, FIG. 4F, and FIG. 4G are flowcharts of still another specific implementation manner of an application display method according to an embodiment of the present disclosure.

As shown in FIG. 4A, step 102 is further implemented as step 1021.

Step 1021: Use, as the second fingerprint information, both the at least two pieces of fingerprint information obtained from the touch operation.

The electronic device may obtain one piece of fingerprint information or multiple pieces of fingerprint information in the touch operation. The electronic device can obtain the one or more pieces of fingerprint information from the touch operation using a sensor. The electronic device may use all the one or more pieces of fingerprint information in the touch operation as the second fingerprint information. In a subsequent process of matching the first fingerprint information and the second fingerprint information, matching is performed between the first fingerprint information and each piece of second fingerprint information sequentially. When one piece of second fingerprint information matches the first fingerprint information, the electronic device determines that the first fingerprint information matches the second fingerprint information successfully.

Figure 4B:
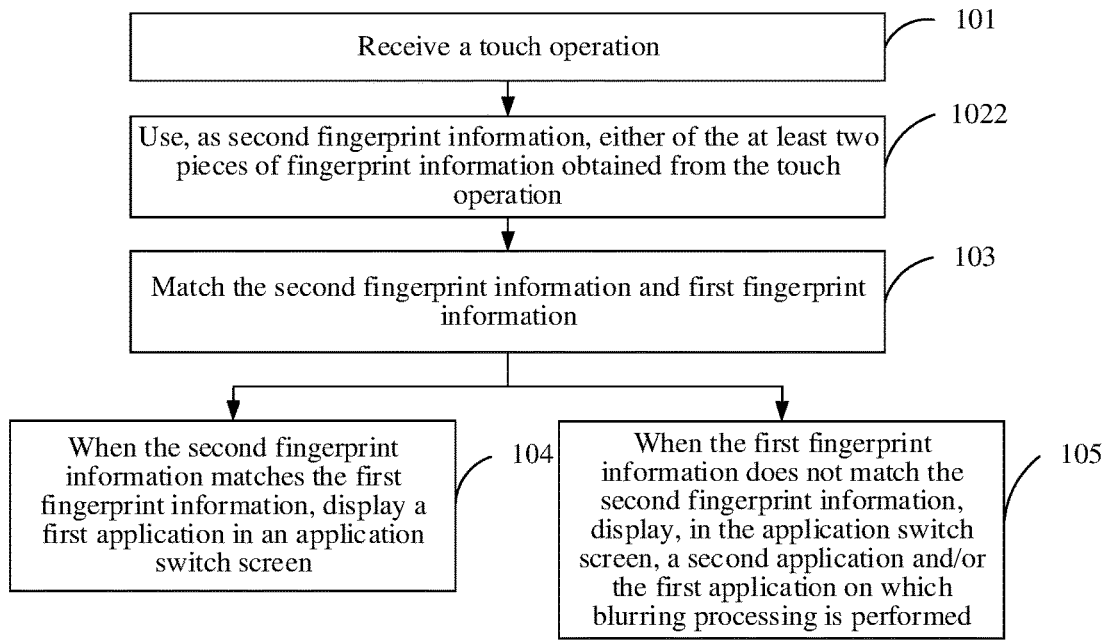

As shown in FIG. 4B, step 102 is further implemented as step 1022.

Step 1022: Use, as the second fingerprint information, either of the at least two pieces of fingerprint information obtained from the touch operation.

The electronic device arbitrarily selects one piece of fingerprint information of the multiple pieces of fingerprint information obtained from the touch operation as the second fingerprint information, and in a subsequent process, performs a procedure of matching the first fingerprint information and the second fingerprint information.

Figure 4C:
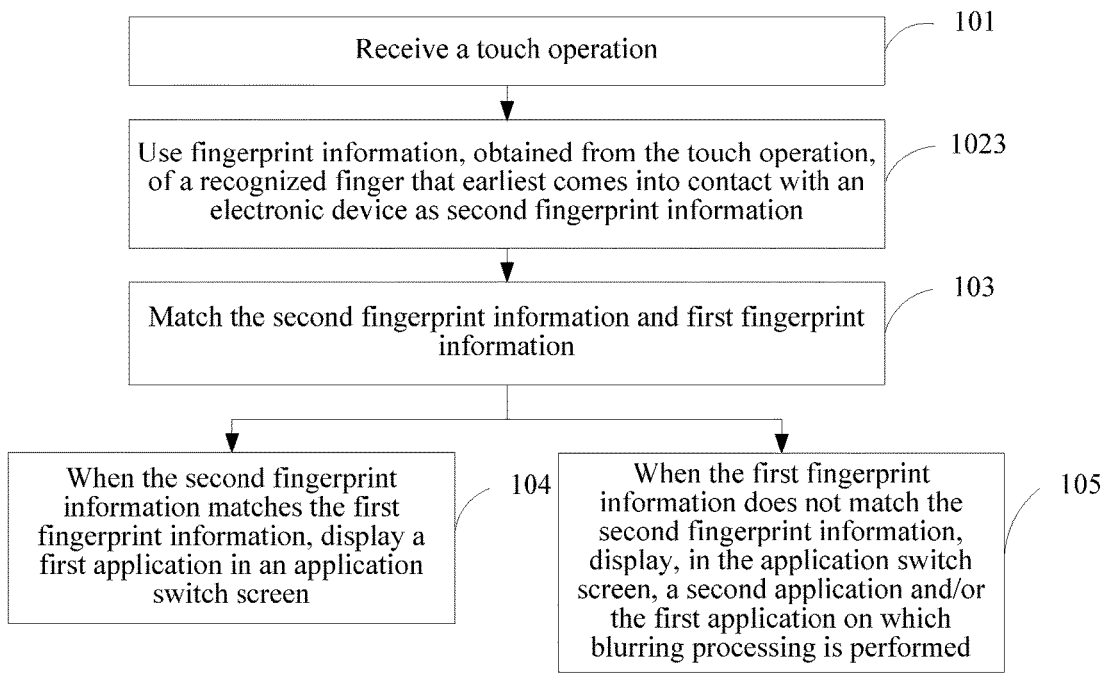

As shown in FIG. 4C, step 102 is further implemented as step 1023.

Step 1023: Use fingerprint information, obtained from the touch operation, of a recognized finger that earliest comes into contact with the electronic device as the second fingerprint information.

The electronic device uses fingerprint information, obtained from the touch operation, of a recognized finger that first comes into contact with the electronic device as the second fingerprint information, and in a subsequent process, performs a procedure of matching the first fingerprint information and the second fingerprint information. Further, the electronic device may obtain, according to a fingerprint sensor built in the electronic device, a time of fingerprint information corresponding to each recognized finger, determine recognized fingerprint information that earliest comes into contact with the electronic device, and use the fingerprint information as the second fingerprint information.

Figure 4D:
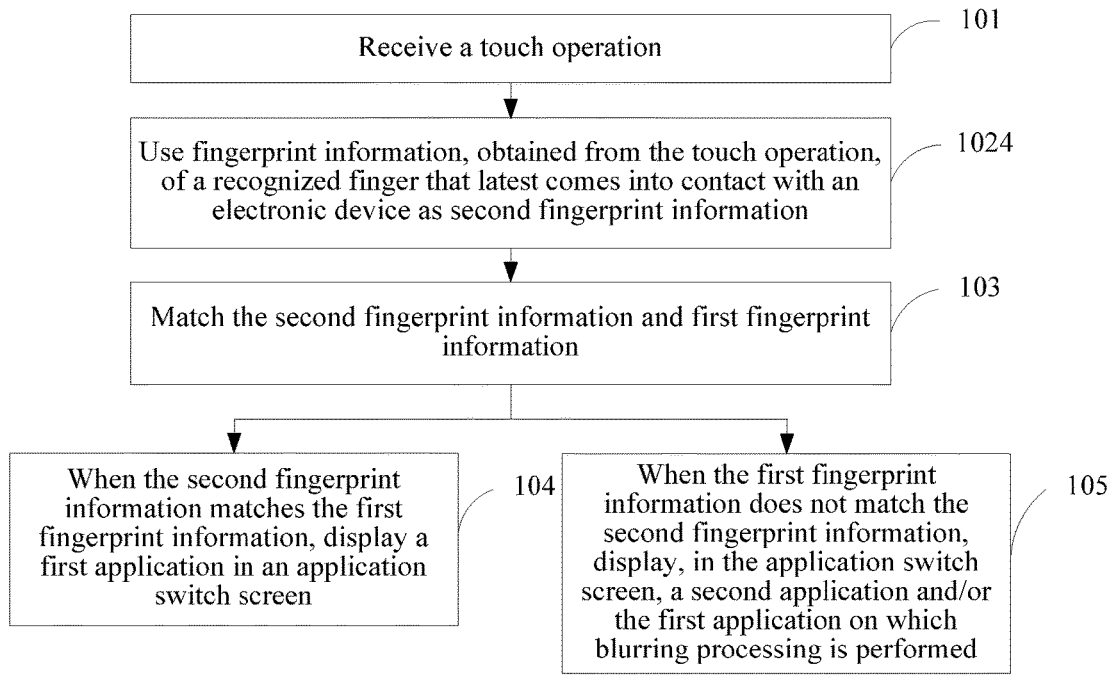

As shown in FIG. 4D, step 102 is further implemented as step 1024.

Step 1024: Use fingerprint information, obtained from the touch operation, of a recognized finger that latest comes into contact with the electronic device as the second fingerprint information.

The electronic device uses fingerprint information, obtained from the touch operation, of a recognized finger that latest comes into contact with the electronic device as the second fingerprint information, and in a subsequent process, performs a procedure of matching the first fingerprint information and the second fingerprint information. Further, the electronic device may obtain, according to a fingerprint sensor built in the electronic device, a time of fingerprint information corresponding to each recognized finger, determine fingerprint information of a recognized finger that latest comes into contact with the electronic device, and use the fingerprint information as the second fingerprint information.

Figure 4E:
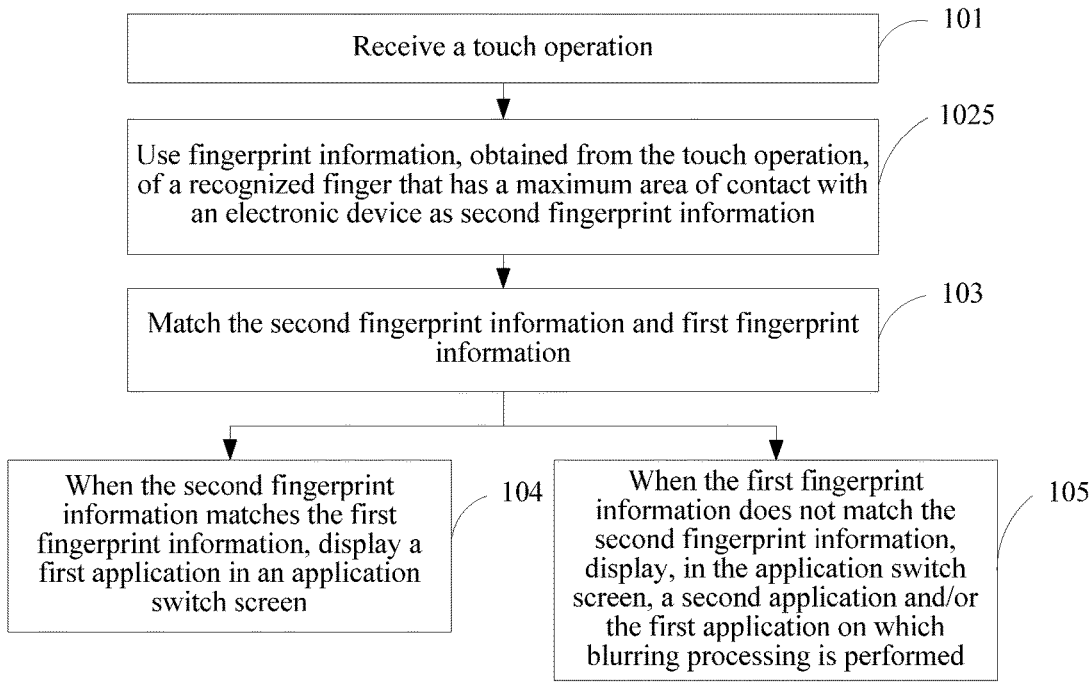

As shown in FIG. 4E, step 102 is further implemented as step 1025.

Step 1025: Use fingerprint information, obtained from the touch operation, of a recognized finger that has a maximum area of contact with the electronic device as the second fingerprint information.

The electronic device uses fingerprint information, obtained from the touch operation, of a recognized finger that has a maximum area of contact with the electronic device as the second fingerprint information, and in a subsequent process, performs a procedure of matching the first fingerprint information and the second fingerprint information. Further, the electronic device may obtain, according to a fingerprint sensor built in the electronic device, an area of contact between each recognized finger and the electronic device, determine fingerprint information of a recognized finger that has a maximum area of contact with the electronic device, and use the fingerprint information as the second fingerprint information.

Figure 4F:
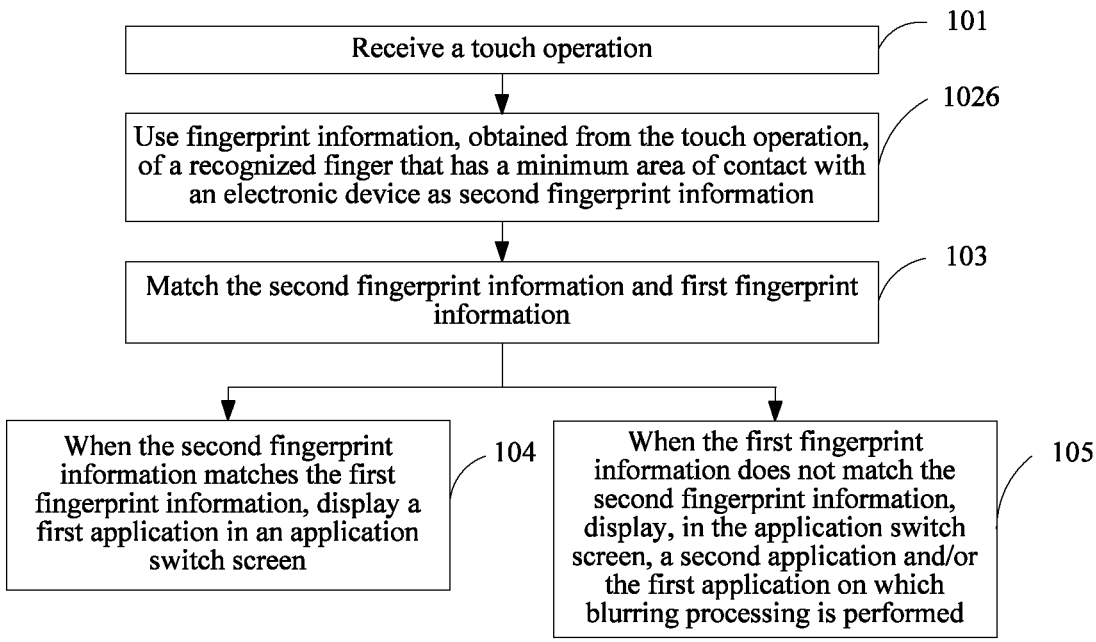

As shown in FIG. 4F, step 102 is further implemented as step 1026.

Step 1026: Use fingerprint information, obtained from the touch operation, of a recognized finger that has a minimum area of contact with the electronic device as the second fingerprint information.

The electronic device uses fingerprint information, obtained from the touch operation, of a recognized finger that has a minimum area of contact with the electronic device as the second fingerprint information, and in a subsequent process, performs a procedure of matching the first fingerprint information and the second fingerprint information. Further, the electronic device may obtain, according to a fingerprint sensor built in the electronic device, an area of contact between each recognized finger and the electronic device, determine fingerprint information of a recognized finger that has a minimum area of contact with the electronic device, and use the fingerprint information as the second fingerprint information.

Figure 4G:
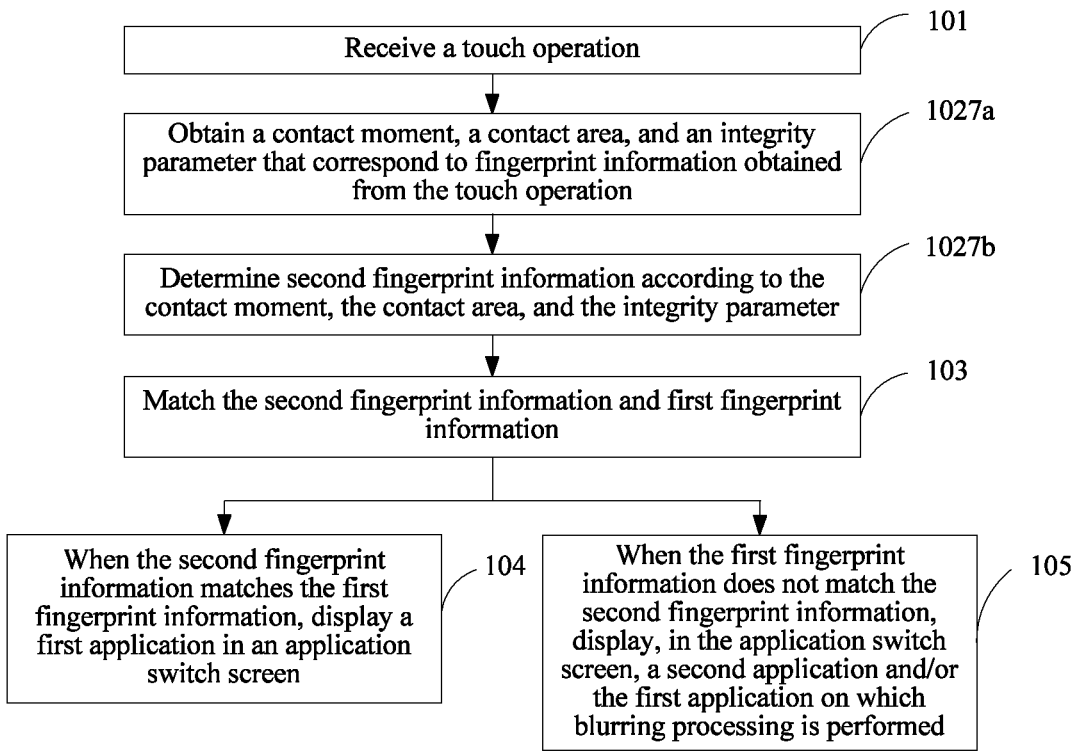

As shown in FIG. 4G, step 102 is further implemented as step 1027a and step 1027b.

Step 1027a: Obtain a contact moment, a contact area, and an integrity parameter that correspond to fingerprint information obtained from the touch operation.

The contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information. For example, the fingerprint information may be a fingerprint image, and the integrity parameter may be a proportion of a size of an actually obtained fingerprint image to a size of a complete fingerprint image. For example, the size of the complete fingerprint image is 1 centimeter (cm)×1 cm, and the size of the actually obtained fingerprint image is 0.7 cm×0.9 cm. The proportion of the size of the actually obtained fingerprint image to the size of the complete fingerprint image is 63%, that is, the integrity parameter is 63%. However, the integrity parameter includes, but is not limited to, the foregoing specific form.

Step 1027b: Determine the second fingerprint information according to the contact moment, the contact area, and the integrity parameter.

The electronic device may comprehensively use the contact moment, the contact area, and the integrity parameter that correspond to the fingerprint information for reference, obtain a comprehensive determining result according to the contact moment, the contact area, and the integrity parameter, and determine the second fingerprint information according to the comprehensive determining result. It should be noted that, a specific method or algorithm for obtaining a comprehensive determining result according to the contact moment, the contact area, and the integrity parameter may be set according to a specific scenario and a specific requirement of a user, and is not limited herein. For example, the contact moment, the contact area, and the integrity parameter that correspond to the fingerprint information may be weighted, and the second fingerprint information is determined according to a weighting result. Further, the electronic device may set a first weight value corresponding to the contact moment, a second weight value corresponding to the contact area, and a third weight value corresponding to the integrity parameter. The electronic device multiplies the first weight value by the reciprocal of the contact moment to obtain a first product, multiplies the second weight value by the contact area to obtain a second product, and multiplies the third weight value by the integrity parameter to obtain a third product. The electronic device uses a sum of the first product, the second product, and the third product as a weighting result, and selects fingerprint information having a maximum weighting result as the second fingerprint information. Alternatively, the electronic device may set a first threshold, a second threshold, and a third threshold, and use fingerprint information whose contact moment is less than the first threshold, contact area is greater than the second threshold, and integrity parameter is greater than the third threshold as the second fingerprint information.

It should be noted that, the coming into contact with the electronic device mentioned in the foregoing embodiments of the present disclosure refers to that the finger of the user comes into contact with a touch screen, on which a fingerprint sensor is disposed, of the electronic device such that the second fingerprint information can be obtained from the touch operation of the user.

It should be noted that, a manner for determining the second fingerprint information includes the foregoing manners and a combination of the foregoing manners. For example, fingerprint information, obtained from the touch operation, of a recognized finger that earliest comes into contact with the electronic device and that has a maximum area of contact with the electronic device is used as the second fingerprint information, or fingerprint information, obtained from the touch operation, of a recognized finger that latest comes into contact with the electronic device and that has a minimum area of contact with the electronic device is used as the second fingerprint information. However, the manner of determining the second fingerprint information is not limited to the foregoing manners and the combination of the foregoing manners, and any change or replacement that is readily conceived by a person skilled in the art shall fall within the protection scope of the present disclosure.

For the application display method provided in this embodiment of the present disclosure, an electronic device can match second fingerprint information obtained from a touch operation and preset first fingerprint information of an owner user, where a first application can be run when verification against the first fingerprint information is performed, and the electronic device determines, according to a matching result, whether to display the first application, the electronic device determines that the touch operation has a permission to display the first application when the second fingerprint information matches the first fingerprint information, and when the second fingerprint information does not match the first fingerprint information, the electronic device determines that the touch operation does not have a permission to display the first application, or that the touch operation does not have a permission to display the first application clearly. In this way, a case in which an application that includes private information of an owner user of an electronic device may be displayed when the electronic device accepts a touch operation of any user is avoided, thereby avoiding a leakage of the private information of the owner user, and reducing an information security risk of the electronic device. Meanwhile, the electronic device may flexibly use multiple manners to obtain the second fingerprint information such that the electronic device has larger operation space, and the electronic device can meet more operation requirements.

Figure 5:
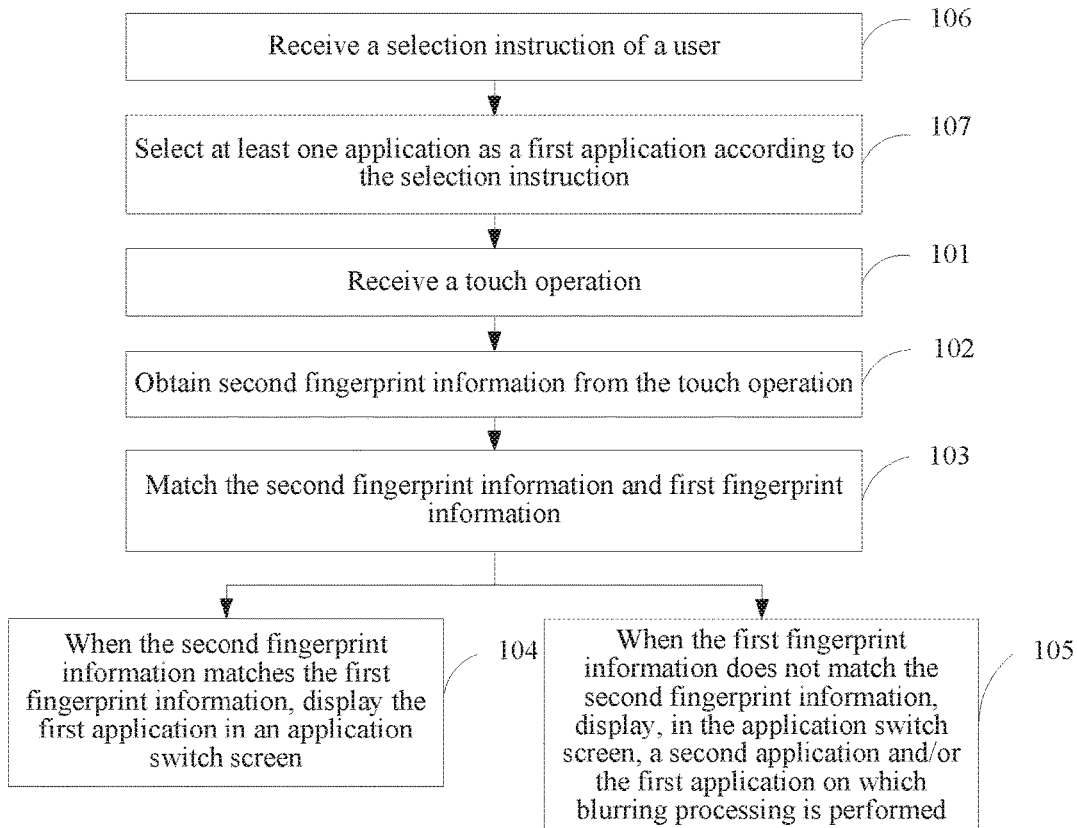
FIG. 5 is a flowchart of yet another specific implementation manner of an application display method according to an embodiment of the present disclosure.

In addition, on the basis of the solution shown in FIG. 3, this embodiment of the present disclosure further provides a specific solution of the application display method. Steps 106 and 107 are added before step 101, to describe how to set the first application. As shown in FIG. 5, the specific solution includes the following steps.

Step 106: Receive a selection instruction of a user.

The selection instruction is used to select at least one application, and in a subsequent process, the selected at least one application is used as the first application. The electronic device may also filter, according to a preset rule, applications stored in the electronic device, and select one or more applications of the applications as the first applications.

Step 107: Select at least one application as the first application according to the selection instruction.

The electronic device selects at least one application as the first application according to the selection instruction. For example, the electronic device receives the selection instruction of the user, and selects, in a list of applications that are installed in the electronic device, one or more applications as the first applications. For another example, during installation of an application in the electronic device, it is prompted whether to set the application as the first application, and it is determined, according to a selection instruction of the user, whether to select the application as the first application.

It should be noted that, the first application may also be set as an application that needs to be logged into using login information. The electronic device obtains login information of an application that has the login information, such as a user name and a user password, and establishes a correspondence between the login information and the first fingerprint information, for example, establishes a correspondence among a QQ number, a QQ password, and fingerprint information of the index finger of the left hand of a user, or establishes a correspondence among an ALIPAY user name, a password, and a fingerprint of the middle finger of the permission hand of a user. Therefore, the first fingerprint information and the login information have a same permission. The first application may be run when verification against either the login information or the first fingerprint information is performed. The electronic device may receive login information input by a user in order to obtain login information of an application, or may receive login information, of an application, provided by a system screen of a mobile terminal in order to establish a correspondence between the login information and the first fingerprint information. After the correspondence between the login information and the first fingerprint information is established, the correspondence among the first fingerprint information, the first application, and the login information of the first application may be stored in the electronic device in a table manner to facilitate search by the electronic device. It should be noted that, before the login information corresponding to the first fingerprint information is used to log in to the first application, it may be further determined whether a function of using the login information corresponding to the first fingerprint information to log in to the first application is enabled. If the function is enabled, a procedure of using the login information corresponding to the first fingerprint information to log in to the first application is executed, or if the function is not enabled, the procedure is stopped. For example, as shown in Table 2, the table includes a function status, an application name, a login account, a login password, and first fingerprint information. The function status is used to indicate whether the function of using the login information corresponding to the first fingerprint information to log in to the first application is enabled. The mobile terminal may search, according to the table, for the correspondence among the first fingerprint information, the first application, and the login information of the first application.

TABLE 2

| Function status | First application Name | Login account | Login password | First fingerprint information |
|---|---|---|---|---|
| Enabled | WECHAT | Usr1 | Pwd1 | FP1 |
| Disabled | QQ | Usr2 | Pwd1 | FP1 |
| Enabled | ALIPAY | Usr3 | Pwd1 | FP2 |

For example, as shown in Table 2, when the second fingerprint information matches FP1, because the function of using the login information corresponding to the first fingerprint information to log in to the first application of WECHAT is enabled and the function of using the login information corresponding to the first fingerprint information to log in to the first application of QQ is disabled, the electronic device displays a screenshot picture, a thumbnail, and/or basic information of WECHAT.

For the application display method provided in this embodiment of the present disclosure, an electronic device can match second fingerprint information obtained from a touch operation and preset first fingerprint information of an owner user, where a first application can be run when verification against the first fingerprint information is performed, and the electronic device determines, according to a matching result, whether to display the first application, the electronic device determines that the touch operation has a permission to display the first application when the second fingerprint information matches the first fingerprint information, and when the second fingerprint information does not match the first fingerprint information, the electronic device determines that the touch operation does not have a permission to display the first application, or that the touch operation does not have a permission to display the first application clearly. In this way, a case in which an application that includes private information of an owner user of an electronic device may be displayed when the electronic device accepts a touch operation of any user is avoided, thereby avoiding a leakage of the private information of the owner user, and reducing an information security risk of the electronic device. Moreover, a user may set the first application in a user-defining manner such that the user conveniently sets and manages an application related to private information in the electronic device.

Figure 6:
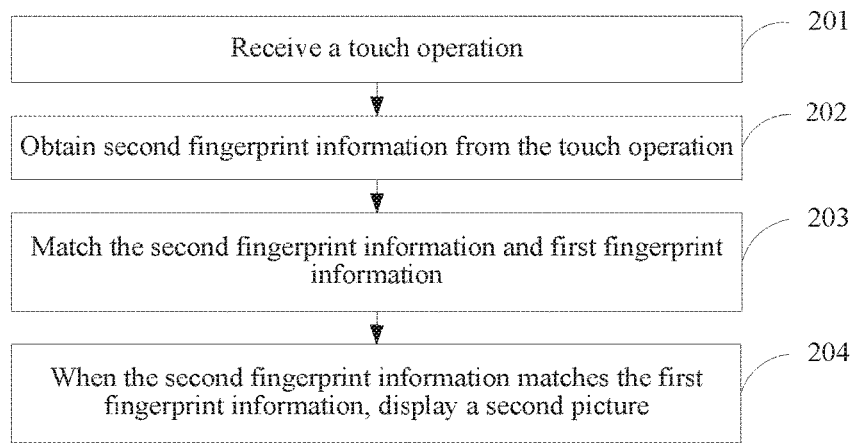
FIG. 6 is a flowchart of a picture display method according to an embodiment of the present disclosure.

An embodiment of the present disclosure provides a picture display method, applied to an electronic device. First fingerprint information is stored in the electronic device, a first picture and a second picture are stored in the electronic device, and the electronic device currently displays the first picture. Verification against the first fingerprint information needs to be performed to perform an operation of viewing the second picture. For example, when fingerprint information A used during verification is not the first fingerprint information, the fingerprint information A does not have a permission to view the second picture. It should be noted that, there may be one or more second pictures. As shown in FIG. 6, the method includes the following steps.

Step 201: Receive a touch operation.

The electronic device currently displays the first picture. The touch operation is used to request to display the second picture. The touch operation triggers an action of switching display of the first picture to display of the second picture. The second picture is a picture located before or after the first picture in a direction consistent with a switching direction indicated by the foregoing touch operation. However, it should be noted that, verification against the first fingerprint information needs to be performed to perform an operation of viewing the second picture.

In this embodiment of the present disclosure, the electronic device has a touch screen, and a fingerprint sensor is disposed on the touch screen, and can obtain fingerprint information from a touch operation of a user on the touch screen of the electronic device. In this embodiment, the touch operation instructs to switch the currently displayed first picture to the second picture. For example, the touch operation may be a gesture operation of a finger flicking to the left or to the permission on the touch screen, or may be a gesture operation of a finger flicking clockwise or counterclockwise on the touch screen, or may be a gesture operation of a finger flicking upward or downward on the touch screen, or may be an operation of a finger tapping an icon or a button used to switch an image. A specific implementation manner of the touch operation is not limited herein.

Step 202: Obtain second fingerprint information from the touch operation.

The second fingerprint information is obtained from the touch operation. The second fingerprint information may be one piece of fingerprint information, or may be multiple pieces of fingerprint information. Specific content of obtaining the second fingerprint information from the touch operation is described in subsequent embodiments.

Step 203: Match the second fingerprint information and first fingerprint information.

The electronic device matches the second fingerprint information obtained from the touch operation and the first fingerprint information prestored in the electronic device. When the second fingerprint information matches the first fingerprint information, it indicates that a fingerprint of a finger corresponding to the second fingerprint information is the same as a fingerprint of a finger corresponding to the first fingerprint information, and the second fingerprint information and the first fingerprint information have a same permission. When the second fingerprint information does not match the first fingerprint information, it indicates that a fingerprint of a finger corresponding to the second fingerprint information is different from a fingerprint of a finger corresponding to the first fingerprint information, and the second fingerprint information and the first fingerprint information have different permissions.

It should be noted that, the first fingerprint information may be one piece of fingerprint information, or may include multiple pieces of fingerprint information. Verification against different first fingerprint information is performed such that different pictures can be viewed. One piece of first fingerprint information may correspond to one second picture, or one piece of first fingerprint information may correspond to multiple second pictures. For example, as shown in Table 3, verification against fingerprint information A needs to be performed to view a picture a, verification against fingerprint information B needs to be performed to view a picture b, verification against the fingerprint information B needs to be performed to view a picture c, and verification against fingerprint information C needs to be performed to view a picture d.

TABLE 3

| First fingerprint information | Second picture |
| --- | --- |
| Fingerprint information A | Picture a |
| Fingerprint information B | Picture b, picture c |
| Fingerprint information C | Picture d |

Step 204: When the second fingerprint information matches the first fingerprint information, display the second picture.

When the second fingerprint information matches the first fingerprint information, the electronic device displays the second picture. Optionally, a picture that can be directly viewed without needing to perform verification against the first fingerprint information may be further displayed at the same time. It should be noted that, the electronic device may display the second picture, basic information of the second picture, and/or the like. For example, a mobile phone currently displays a picture A. According to a switching order, several pictures arranged after the picture A are a picture B and a picture C. The second picture is the picture B. That is, verification against the first fingerprint information needs to be performed to view the picture B. The mobile phone receives a touch operation of a user to request to view a next picture of the picture A. When the second fingerprint information matches the first fingerprint information, the mobile phone displays the picture B.

In addition, a manner for displaying the second picture is also not limited. For example, the second picture may completely cover the currently displayed first picture, or the second picture may partially cover the currently displayed first picture, or the second picture may not overlap the currently displayed first picture, and the second picture and the first picture are displayed on the electronic device using a same size. When the second fingerprint information obtained from the touch operation matches the first fingerprint information, an order relationship among the first picture and the second pictures may also be omitted, and the mobile terminal displays any second picture. For example, the first picture is the picture A, and according to an order, second pictures located after the picture A in order are sequentially the picture B, the picture C, and the picture D. When the first fingerprint information matches the second fingerprint information, the electronic device may display any one of the picture B, the picture C, or the picture D.

For the picture display method provided in this embodiment of the present disclosure, in a scenario in which an electronic device can currently display a first picture, the electronic device matches second fingerprint information in a touch operation of a user and preset first fingerprint information of an owner user, where a second picture can be displayed when verification against the first fingerprint information is performed, and the electronic device determines, according to a matching result, whether to display the second picture, when the second fingerprint information matches the first fingerprint information, the electronic device determines that the touch operation has a permission to switch display of the first picture to display of the second picture. In this way, a case in which a picture that includes private information of an owner user of an electronic device may be displayed when the electronic device accepts a touch operation of any user is avoided, thereby avoiding a leakage of the private information of the owner user, and reducing an information security risk of the electronic device.

Figure 7:
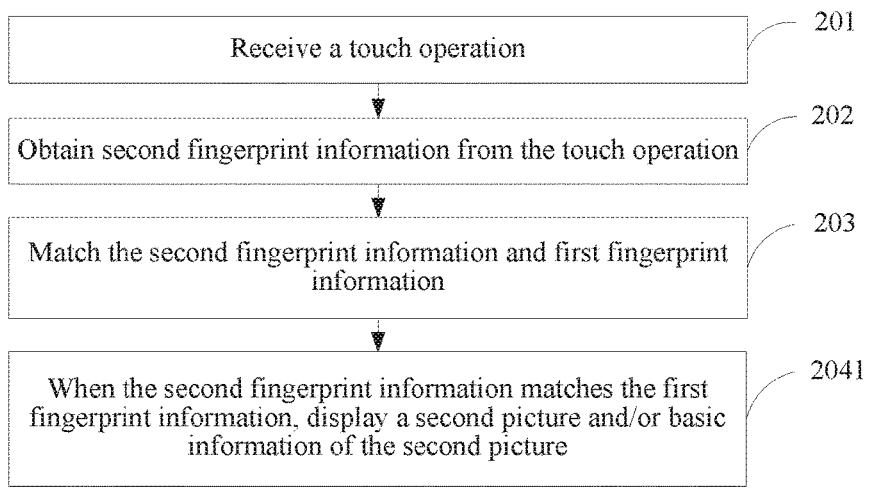
FIG. 7 is a flowchart of a specific implementation manner of a picture display method according to an embodiment of the present disclosure.

Further, when the second fingerprint information matches the first fingerprint information, the manner for displaying the second picture may be further detailed. On the basis of the solution shown in FIG. 1, this embodiment of the present disclosure further provides a specific solution of the picture display method, to further detail a process of performing step 204 shown in FIG. 6. Step 204 may be implemented as step 2041, and as shown in FIG. 7.

Step 2041: When the second fingerprint information matches the first fingerprint information, display the second picture and/or basic information of the second picture.

When the second fingerprint information matches the first fingerprint information, the electronic device displays the second picture and/or basic information of the second picture. Further, the basic information may include information such as a name of the picture, a time when the picture is photographed, and a size of memory occupied by the picture.

For the picture display method provided in this embodiment of the present disclosure, in a scenario in which an electronic device can currently display a first picture, the electronic device matches second fingerprint information in a touch operation of a user and preset first fingerprint information of an owner user, where a second picture can be displayed when verification against the first fingerprint information is performed, and the electronic device determines, according to a matching result, whether to display the second picture, when the second fingerprint information matches the first fingerprint information, the electronic device determines that the touch operation has a permission to switch display of the first picture to display of the second picture. In this way, a case in which a picture that includes private information of an owner user of an electronic device may be displayed when the electronic device accepts a touch operation of any user is avoided, thereby avoiding a leakage of the private information of the owner user, and reducing an information security risk of the electronic device.

Figure 8:
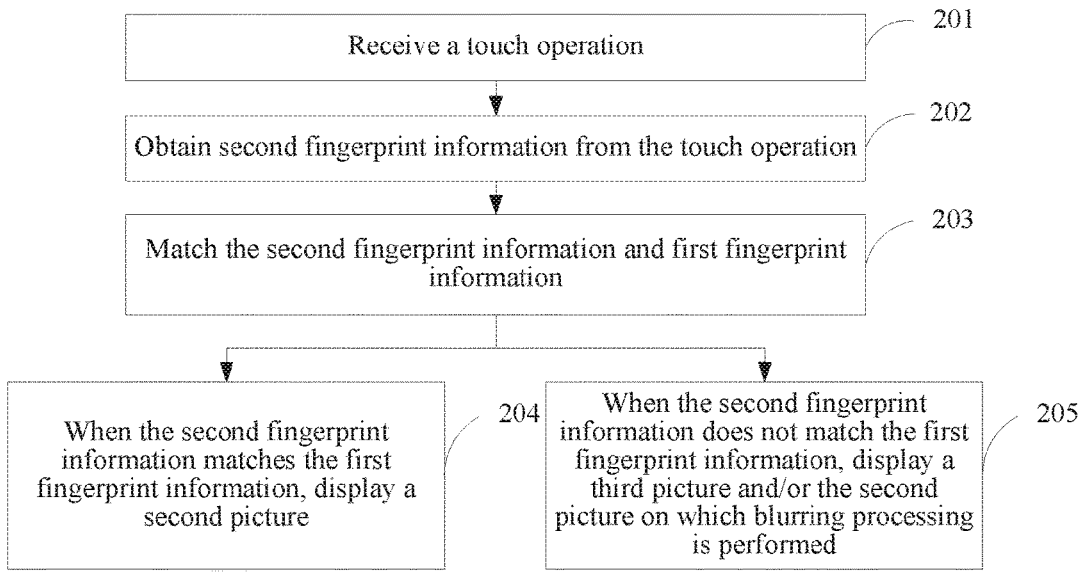
FIG. 8 is a flowchart of another specific implementation manner of a picture display method according to an embodiment of the present disclosure.

In addition, when the second fingerprint information does not match the first fingerprint information, the electronic device does not display the second picture, or displays the second picture on which special processing is performed, for example, the second picture on which blurring processing is performed. On the basis of the solution shown in FIG. 6, this embodiment of the present disclosure further provides a specific solution of the picture display method. As shown in FIG. 8, the method further includes the following step.

Step 205: When the second fingerprint information does not match the first fingerprint information, display a third picture and/or the second picture on which blurring processing is performed.

Verification against the first fingerprint information does not need to be performed to perform an operation of viewing the third picture on the electronic device. That is, when receiving an instruction for instructing to view the third picture, the electronic device may directly run the third picture, and verification against the first fingerprint information does need to be performed. Whether the third picture can be viewed is not related to the first fingerprint information.

When the second fingerprint information does not match the first fingerprint information, the electronic device independently displays the third picture, or displays the third picture and the second picture on which blurring processing is performed such that a user currently using the electronic device cannot obtain, from content displayed by the electronic device, information involving privacy of an owner user. For example, a picture A, a picture B, a picture C, and a picture D are stored in a mobile phone, where the first picture is the picture A, and the second picture is picture B, the third picture is the picture C and the picture D. When the first fingerprint information does not match the second fingerprint information, the mobile phone displays the picture C or the picture D, and/or basic information of the picture C or the picture D, or, the mobile phone displays the picture A on which blurring processing is performed.

For the picture display method provided in this embodiment of the present disclosure, in a scenario in which an electronic device can currently display a first picture, the electronic device matches second fingerprint information obtained from a touch operation of a user and preset first fingerprint information of an owner user, where a second picture can be displayed when verification against the first fingerprint information is performed, and the electronic device determines, according to a matching result, whether to display the second picture. The electronic device determines that the touch operation has a permission to switch display of the first picture to display of the second picture when the second fingerprint information matches the first fingerprint information, and the electronic device determines that the touch operation does not have a permission to switch display of the first picture to display of the second picture when the second fingerprint information does not match the first fingerprint information. In this way, a case in which a picture that includes private information of an owner user of an electronic device may be displayed when the electronic device accepts a touch operation of any user is avoided, thereby avoiding a leakage of the private information of the owner user, and reducing an information security risk of the electronic device.

Further, on the basis of the solution shown in FIG. 8, when the electronic device obtains at least two pieces of fingerprint information from one touch operation, regarding how to determine the second fingerprint information in the obtained at least two pieces of fingerprint information, this embodiment of the present disclosure further provides a specific solution of the picture display method. This solution further details a process of performing step 202 in the solution shown in FIG. 6. Step 202 may be implemented as any one of the steps 2021 to 2026, or 2027a and 2027b. Steps 2021 to 2026 and 2027a and 2027b are described below separately.

Figure 9A:
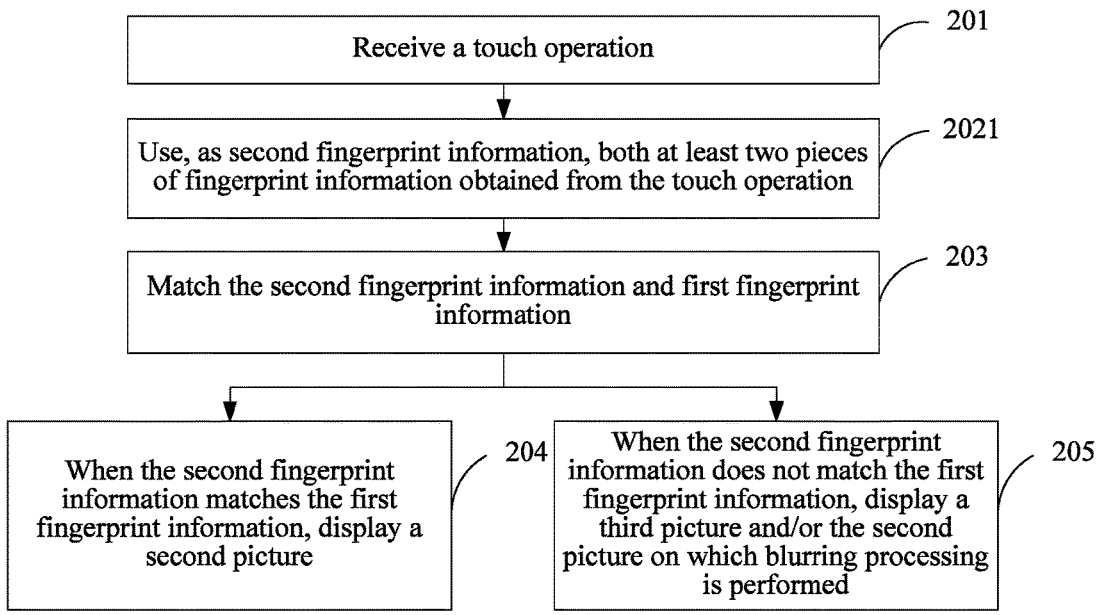
FIG. 9A, FIG. 9B, FIG. 9C, FIG. 9D, FIG. 9E, FIG. 9F, and FIG. 9G are flowcharts of still another specific implementation manner of a picture display method according to an embodiment of the present disclosure.

As shown in FIG. 9A, step 202 is further implemented as step 2021.

Step 2021: Use, as the second fingerprint information, both the at least two pieces of fingerprint information obtained from the touch operation.

The electronic device may obtain one piece of fingerprint information or multiple pieces of fingerprint information in the touch operation. The electronic device can obtain the one or more pieces of fingerprint information from the touch operation using a sensor. The electronic device may use all the one or more pieces of fingerprint information in the touch operation as the second fingerprint information. In a subsequent process of matching the first fingerprint information and the second fingerprint information, matching is performed between the first fingerprint information and each piece of second fingerprint information sequentially. When one piece of second fingerprint information matches the first fingerprint information, the electronic device determines that the first fingerprint information matches the second fingerprint information successfully.

Figure 9B:
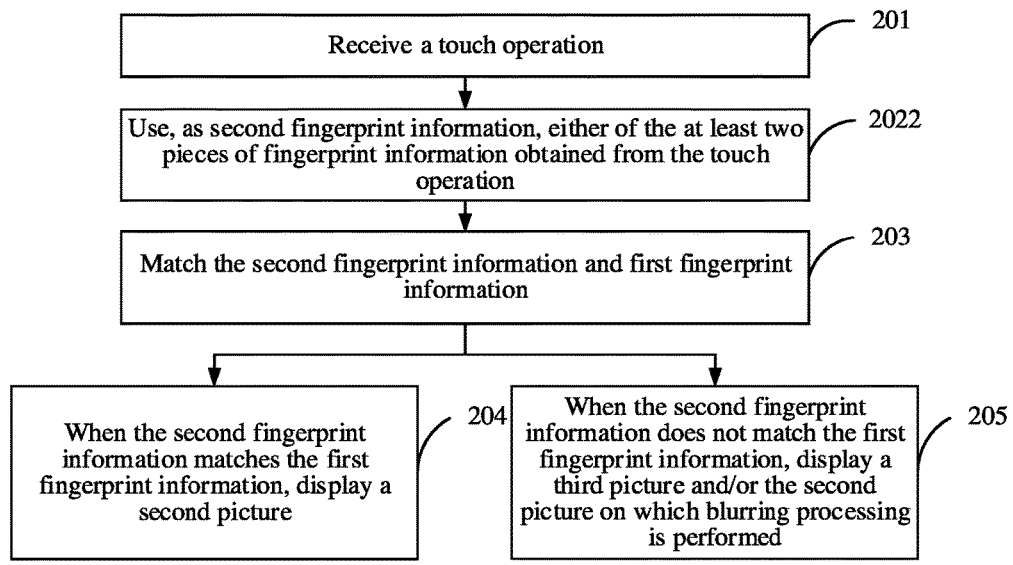

As shown in FIG. 9B, step 202 is further implemented as step 2022.

Step 2022: Use, as the second fingerprint information, either of the at least two pieces of fingerprint information obtained from the touch operation.

The electronic device arbitrarily selects one piece of fingerprint information of the multiple pieces of fingerprint information obtained from the touch operation as the second fingerprint information, and in a subsequent process, performs a procedure of matching the first fingerprint information and the second fingerprint information.

Figure 9C:
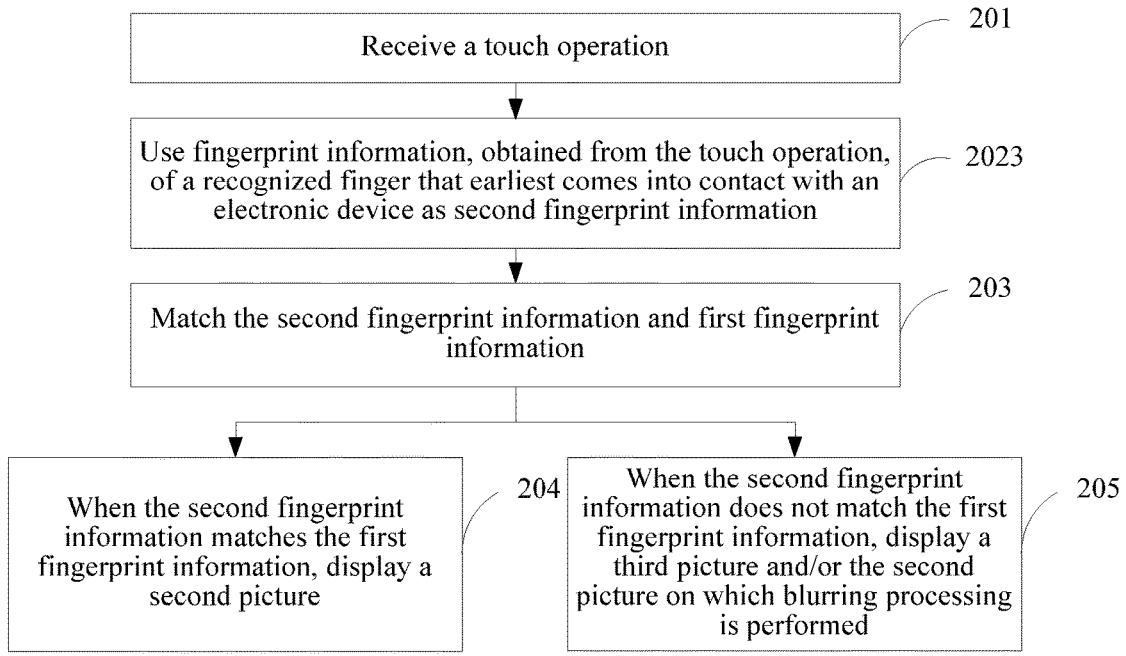

As shown in FIG. 9C, step 202 is further implemented as step 2023.

Step 2023: Use fingerprint information, obtained from the touch operation, of a recognized finger that earliest comes into contact with the electronic device as the second fingerprint information.

The electronic device uses fingerprint information, obtained from the touch operation, of a recognized finger that first comes into contact with the electronic device as the second fingerprint information, and in a subsequent process, performs a procedure of matching the first fingerprint information and the second fingerprint information. Further, the electronic device may obtain, according to a fingerprint sensor built in the electronic device, a time of fingerprint information corresponding to each recognized finger, determine recognized fingerprint information that earliest comes into contact with the electronic device, and use the fingerprint information as the second fingerprint information.

Figure 9D:
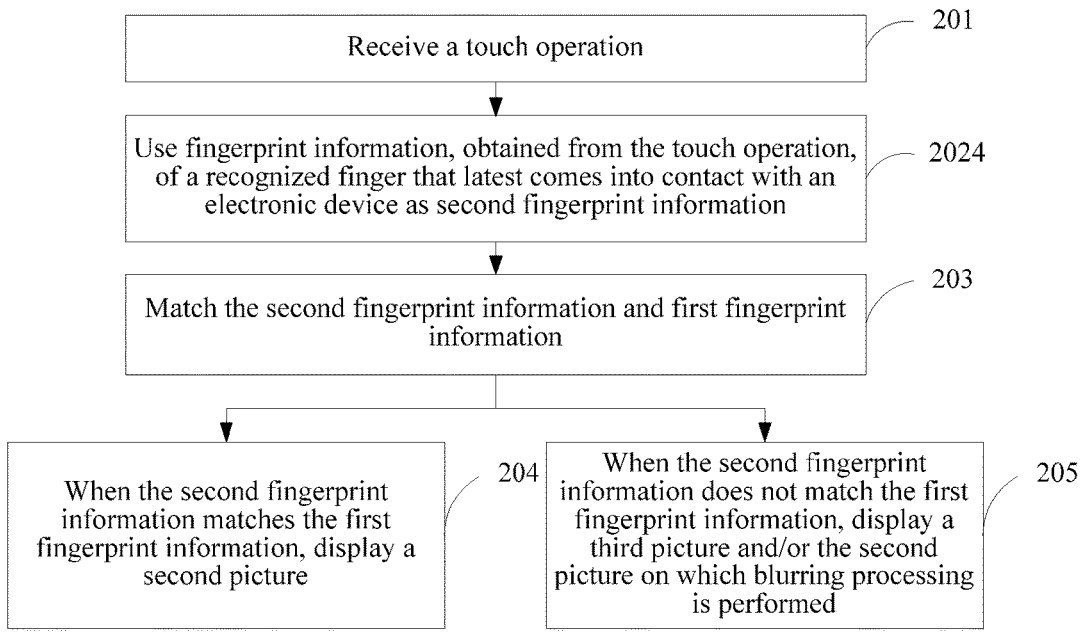

As shown in FIG. 9D, step 202 is further implemented as step 2024.

Step 2024: Use fingerprint information, obtained from the touch operation, of a recognized finger that latest comes into contact with the electronic device as the second fingerprint information.

The electronic device uses fingerprint information, obtained from the touch operation, of a recognized finger that latest comes into contact with the electronic device as the second fingerprint information, and in a subsequent process, performs a procedure of matching the first fingerprint information and the second fingerprint information. Further, the electronic device may obtain, according to a fingerprint sensor built in the electronic device, a time of fingerprint information corresponding to each recognized finger, determine fingerprint information of a recognized finger that latest comes into contact with the electronic device, and use the fingerprint information as the second fingerprint information.

Figure 9E:
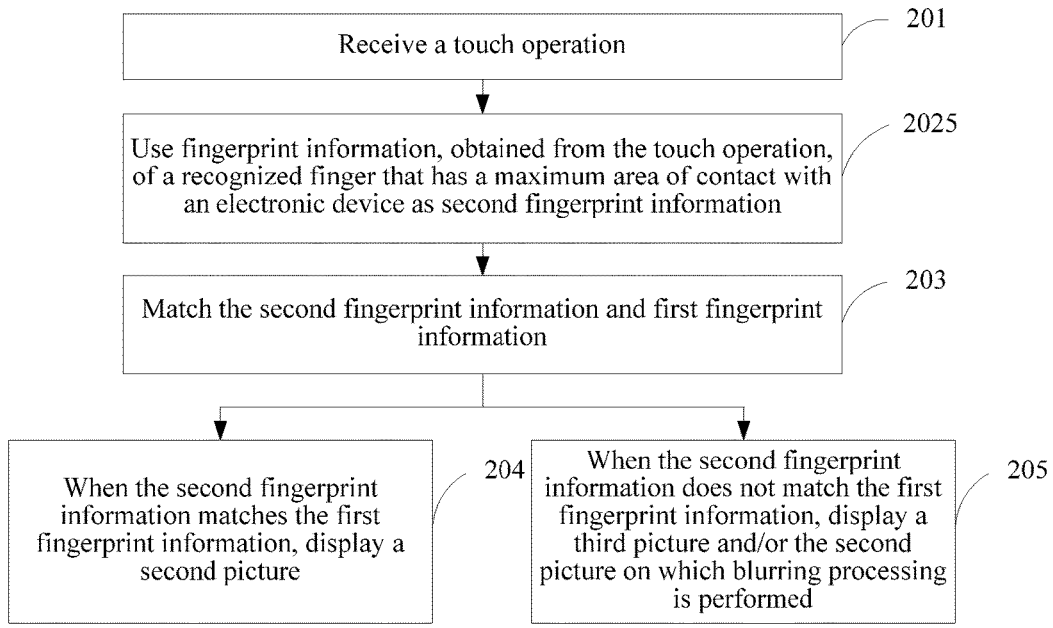

As shown in FIG. 9E, step 202 is further implemented as step 2025.

Step 2025: Use fingerprint information, obtained from the touch operation, of a recognized finger that has a maximum area of contact with the electronic device as the second fingerprint information.

The electronic device uses fingerprint information, obtained from the touch operation, of a recognized finger that has a maximum area of contact with the electronic device as the second fingerprint information, and in a subsequent process, performs a procedure of matching the first fingerprint information and the second fingerprint information. Further, the electronic device may obtain, according to a fingerprint sensor built in the electronic device, an area of contact between each recognized finger and the electronic device, determine fingerprint information of a recognized finger that has a maximum area of contact with the electronic device, and use the fingerprint information as the second fingerprint information.

Figure 9F:
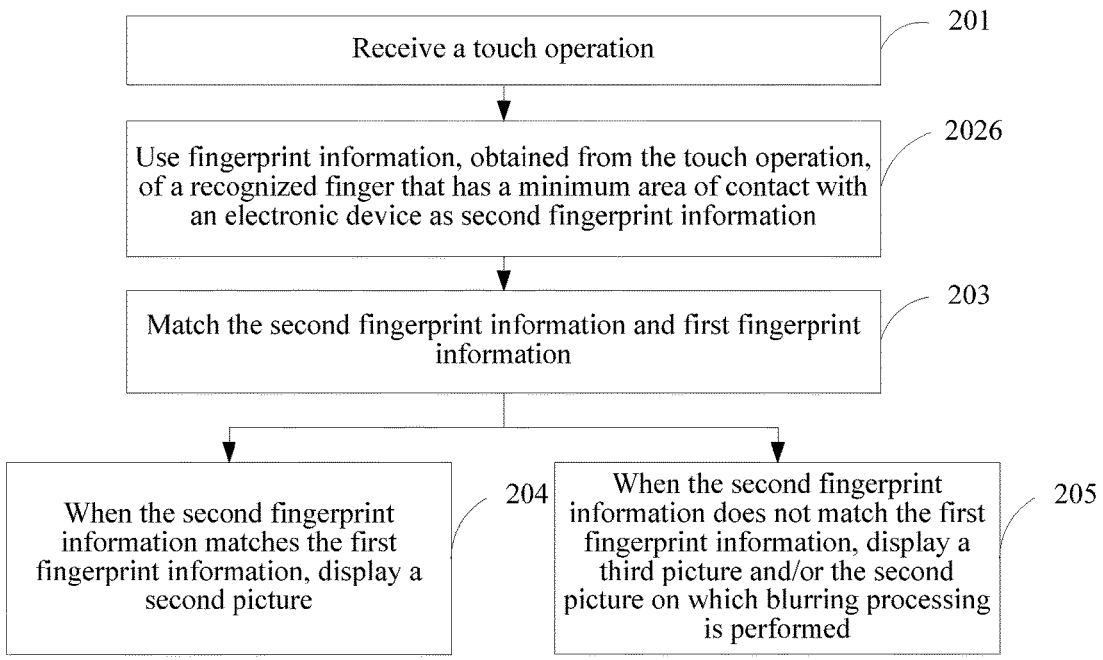

As shown in FIG. 9F, step 202 is further implemented as step 2026.

Step 2026: Use fingerprint information, obtained from the touch operation, of a recognized finger that has a minimum area of contact with the electronic device as the second fingerprint information.

The electronic device uses fingerprint information, obtained from the touch operation, of a recognized finger that has a minimum area of contact with the electronic device as the second fingerprint information, and in a subsequent process, performs a procedure of matching the first fingerprint information and the second fingerprint information. Further, the electronic device may obtain, according to a fingerprint sensor built in the electronic device, an area of contact between each recognized finger and the electronic device, determine fingerprint information of a recognized finger that has a minimum area of contact with the electronic device, and use the fingerprint information as the second fingerprint information.

Figure 9G:
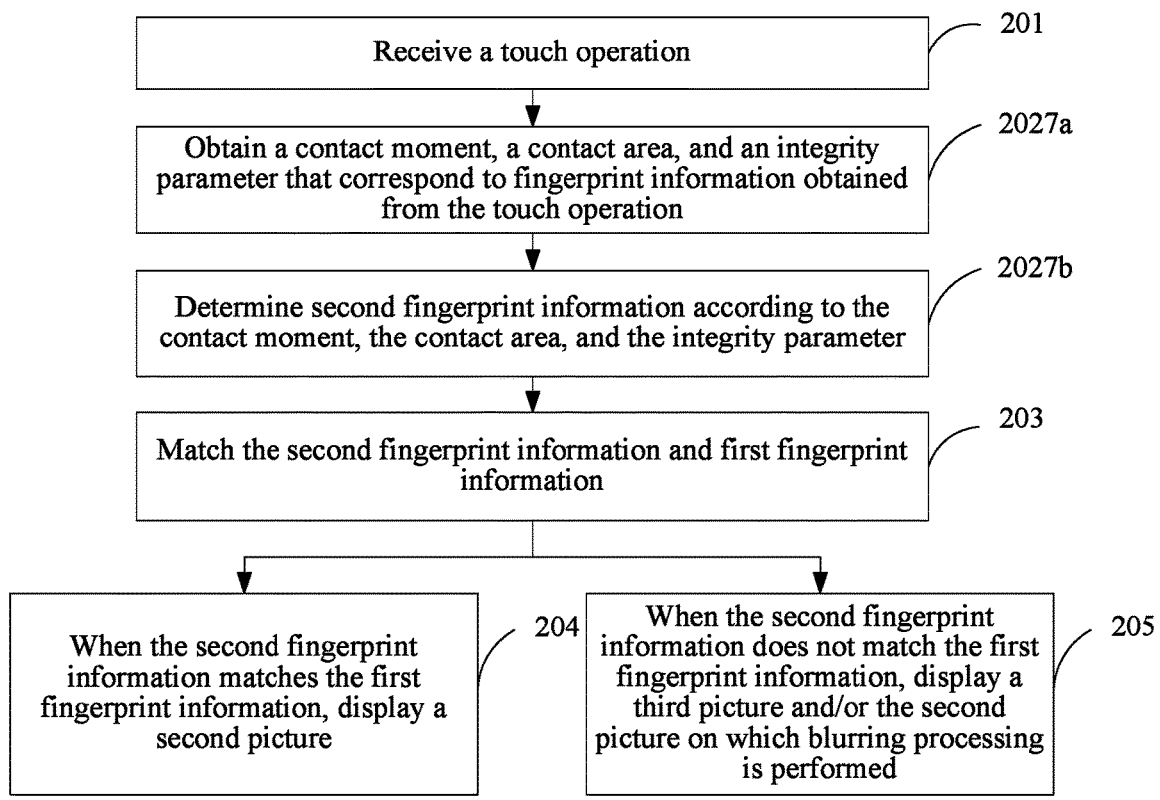

As shown in FIG. 9G, step 202 is further implemented as step 2027a and step 2027b.

Step 2027a: Obtain a contact moment, a contact area, and an integrity parameter that correspond to fingerprint information obtained from the touch operation.

The contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information. For a specific form of the integrity parameter, refer to the description of step 1027a.

Step 2027b: Determine the second fingerprint information according to the contact moment, the contact area, and the integrity parameter.

For a specific description, refer to step 1027b, and details are no longer described herein.

It should be noted that, the coming into contact with the electronic device mentioned in the foregoing embodiments of the present disclosure refers to that the finger of the user comes into contact with a touch screen, on which a fingerprint sensor is disposed, of the electronic device such that the second fingerprint information can be obtained from the touch operation of the user.

It should be noted that, a manner for determining the second fingerprint information includes the foregoing manners and a combination of the foregoing manners. For example, fingerprint information, obtained from the touch operation, of a recognized finger that earliest comes into contact with the electronic device and that has a maximum area of contact with the electronic device is used as the second fingerprint information, or fingerprint information, obtained from the touch operation, of a recognized finger that latest comes into contact with the electronic device and that has a minimum area of contact with the electronic device is used as the second fingerprint information. However, the manner for determining the second fingerprint information is not limited to the foregoing manners and the combination of the foregoing manners, and any change or replacement that is readily conceived by a person skilled in the art shall fall within the protection scope of the present disclosure.

For the picture display method provided in this embodiment of the present disclosure, in a scenario in which an electronic device can currently display a first picture, the electronic device matches second fingerprint information obtained from a touch operation and preset first fingerprint information of an owner user, where a second picture can be displayed when verification against the first fingerprint information is performed, and the electronic device determines, according to a matching result, whether to display the second picture, the electronic device determines that the touch operation has a permission to switch display of the first picture to display of the second picture when the second fingerprint information matches the first fingerprint information, and the electronic device determines that the touch operation does not have a permission to switch display of the first picture to display of the second picture when the second fingerprint information does not match the first fingerprint information. In this way, a case in which a picture that includes private information of an owner user of an electronic device may be displayed when the electronic device accepts a touch operation of any user is avoided, thereby avoiding a leakage of the private information of the owner user, and reducing an information security risk of the electronic device. Meanwhile, the electronic device may flexibly use multiple manners to obtain the second fingerprint information such that the electronic device has larger operation space, and the electronic device can meet more operation requirements.

Figure 10:
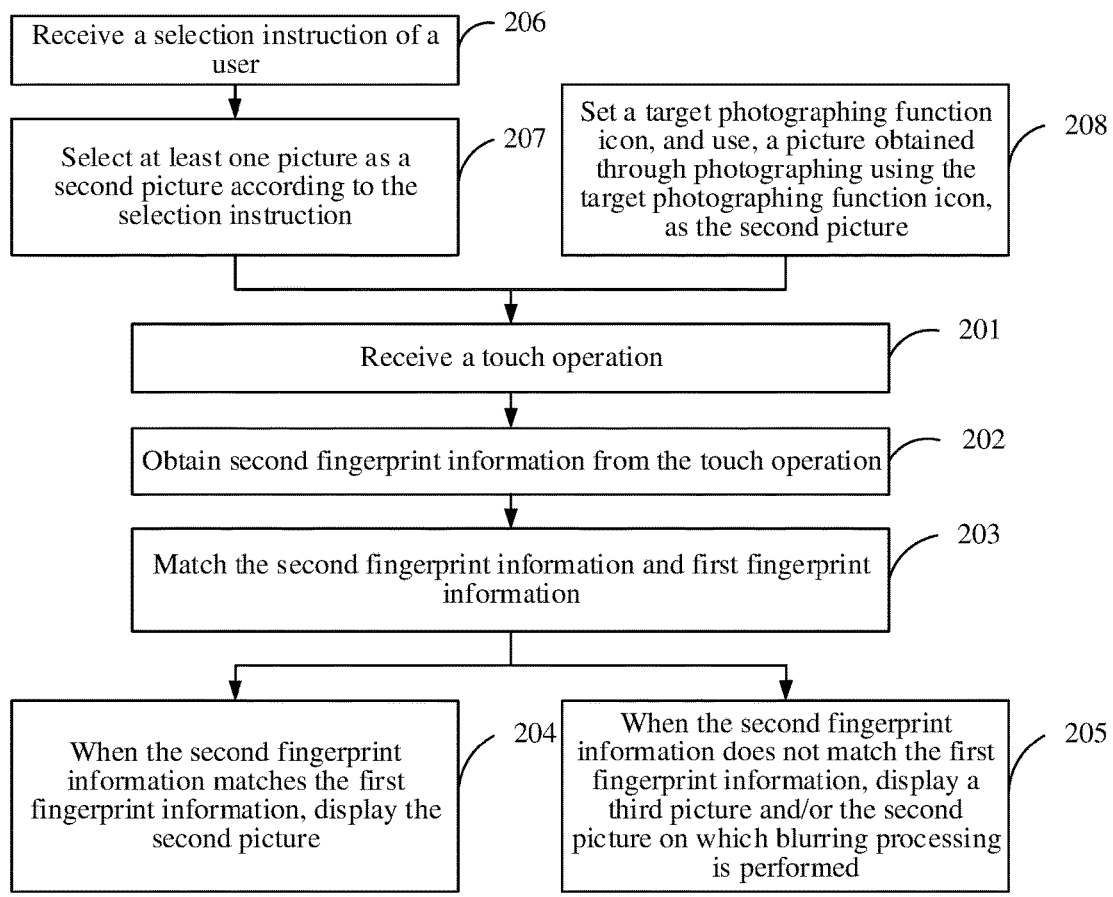
FIG. 10 is a flowchart of yet another specific implementation manner of a picture display method according to an embodiment of the present disclosure.

In addition, on the basis of the solution shown in FIG. 8, this embodiment of the present disclosure further provides a specific solution of the picture display method. Steps 206 and 207 or 208 are added before step 201 to describe how to set the second picture. As shown in FIG. 10, the specific solution includes the following steps.

Step 206: Receive a selection instruction of a user.

The selection instruction is used to select at least one picture, and in a subsequent procedure, the selected picture is used as the second picture. The electronic device may also filter, according to a preset rule, pictures stored in the electronic device, and select one or more pictures of the pictures as the second pictures.

Step 207: Select at least one picture as the second picture according to the selection instruction.

The electronic device selects at least one picture as the second picture according to the selection instruction. For example, the electronic device receives the selection instruction of the user, and selects, in a list of pictures in the electronic device, one or more pictures as the second pictures. For another example, when the electronic device photographs a photo or imports a picture, it is prompted whether to set the picture as the second picture, and according to a selection instruction of the user, it is determined whether to select the picture as the second picture.

Step 208: Set a target photographing function icon, and use, a picture obtained through photographing using the target photographing function icon, as the second picture.

The electronic device may further set a target photographing function icon, and use a picture, obtained through photographing using the target photographing function icon, as the second picture. A picture photographed using another function is used as the third picture.

For the picture display method provided in this embodiment of the present disclosure, in a scenario in which an electronic device can currently display a first picture, the electronic device matches second fingerprint information obtained from a touch operation and preset first fingerprint information of an owner user, where a second picture can be displayed when verification against the first fingerprint information is performed, and the electronic device determines, according to a matching result, whether to display the second picture, when the second fingerprint information matches the first fingerprint information, the electronic device determines that the touch operation has a permission to switch display of the first picture to display of the second picture, and when the second fingerprint information does not match the first fingerprint information, the electronic device determines that the touch operation does not have a permission to switch display of the first picture to display of the second picture. In this way, a case in which a picture that includes private information of an owner user of an electronic device may be displayed when the electronic device accepts a touch operation of any user is avoided, thereby avoiding a leakage of the private information of the owner user, and reducing an information security risk of the electronic device. Moreover, a user may set the second picture in a user-defining manner such that the user conveniently sets and manages a picture related to private information in the electronic device.

In addition to the foregoing scenario of switching the first picture to the second picture, the picture display method in the present disclosure is also applicable to a scenario of opening an image library or an album and simultaneously displaying multiple pictures on an electronic device. Further, multiple pictures are stored in the electronic device. The multiple pictures include a private picture, and first fingerprint information is stored in the electronic device. Verification against the first fingerprint information needs to be performed to view the private picture. The electronic device receives a touch operation. The touch operation is used to view multiple pictures. The electronic device obtains second fingerprint information from the touch operation, and matches the second fingerprint information and the first fingerprint information. When the second fingerprint information matches the first fingerprint information, the electronic device displays the private picture. When the second fingerprint information does not match the first fingerprint information, the electronic device displays a non-private picture, or displays a non-private picture and a private picture on which blurring processing is performed. Therefore, when an image library or album is entered, a picture including private information of an owner user can also be protected, thereby avoiding a leakage of private information of an owner user, and reducing an information security risk of the electronic device.

Figure 11:
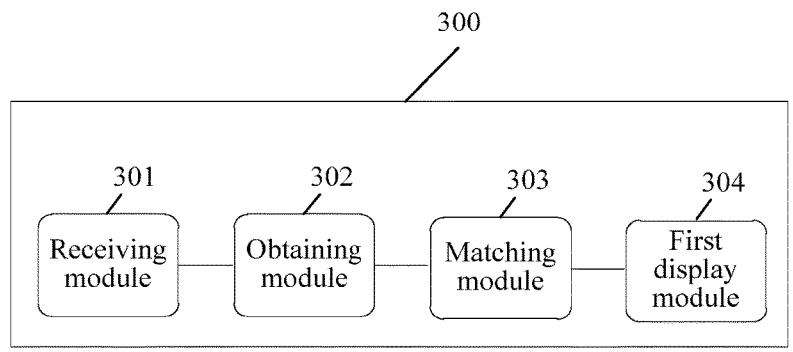
FIG. 11 is a schematic structural diagram of an application display apparatus according to an embodiment of the present disclosure.

An embodiment of the present disclosure provides an application display apparatus 300. First fingerprint information is stored in the apparatus 300, a first application is installed in the apparatus 300, and verification against the first fingerprint information needs to be performed to run the first application. As shown in FIG. 11, the apparatus 300 includes the following.

A receiving module 301 is configured to receive a touch operation.

The touch operation is used to request display an application switch screen.

An obtaining module 302 is configured to obtain second fingerprint information from the touch operation.

A matching module 303 is configured to match the second fingerprint information and the first fingerprint information.

A first display module 304 is configured to display the first application in the application switch screen when the second fingerprint information matches the first fingerprint information.

For the application display apparatus 300 provided in this embodiment of the present disclosure, the apparatus 300 can match second fingerprint information obtained from a touch operation and preset first fingerprint information of an owner user, where a first application can be run when verification against the first fingerprint information is performed, and the apparatus 300 determines, according to a matching result, whether to display the first application. The apparatus 300 determines that the touch operation has a permission to display the first application when the second fingerprint information matches the first fingerprint information. In this way, a case in which an application that includes private information of an owner user of the apparatus 300 may be displayed when the apparatus accepts a touch operation of any user is avoided, thereby avoiding a leakage of the private information of the owner user, and reducing an information security risk of the apparatus.

Figure 12:
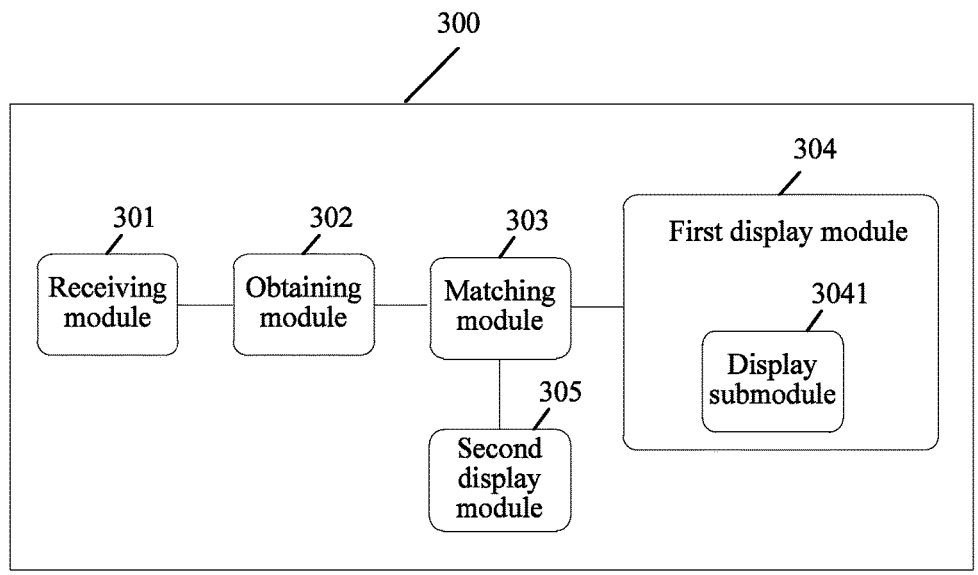
FIG. 12 is a schematic structural diagram of a specific implementation manner of an application display apparatus according to an embodiment of the present disclosure.

In addition, as shown in FIG. 12, the apparatus 300 further includes a second display module 305 configured to display, in the application switch screen, a second application and/or the first application on which blurring processing is performed when the second fingerprint information does not match the first fingerprint information.

Verification against the first fingerprint information does not need to be performed to run the second application.

Further, as shown in FIG. 12, the first display module 304 includes a display submodule 3041 configured to display a screen thumbnail of the first application and/or basic information of the first application in the application switch screen.

For the application display apparatus 300 provided in this embodiment of the present disclosure, the apparatus 300 can match second fingerprint information obtained from a touch operation and preset first fingerprint information of an owner user, where a first application can be run when verification against the first fingerprint information is performed, and the apparatus 300 determines, according to a matching result, whether to display the first application. The apparatus 300 determines that the touch operation has a permission to display the first application when the second fingerprint information matches the first fingerprint information, and the apparatus 300 determines that the touch operation does not have a permission to display the first application, or that the touch operation does not have a permission to display the first application clearly when the second fingerprint information does not match the first fingerprint information. In this way, a case in which an application that includes private information of an owner user of the apparatus 300 may be displayed when the apparatus accepts a touch operation of any user is avoided, thereby avoiding a leakage of the private information of the owner user, and reducing an information security risk of the apparatus 300.

Figure 13A:
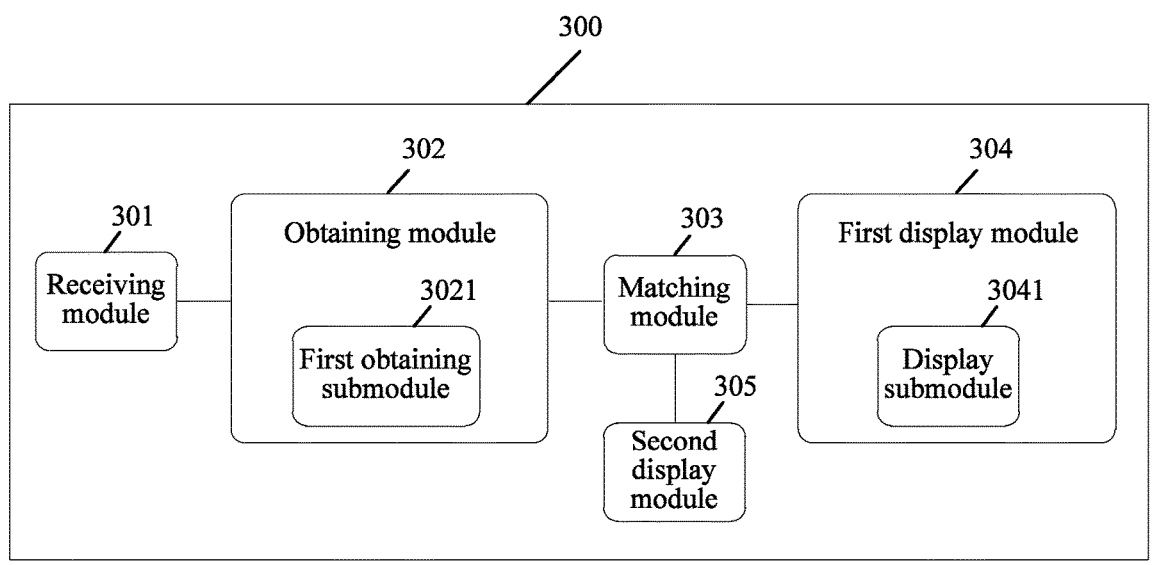
FIG. 13A, FIG. 13B, FIG. 13C, FIG. 13D, FIG. 13E, FIG. 13F, and FIG. 13G are schematic structural diagrams of another specific implementation manner of an application display apparatus according to an embodiment of the present disclosure.

Further, as shown in FIG. 13A, the obtaining module 302 includes a first obtaining submodule 3021 configured to use, as the second fingerprint information, both the at least two pieces of fingerprint information obtained from the touch operation.

Figure 13B:
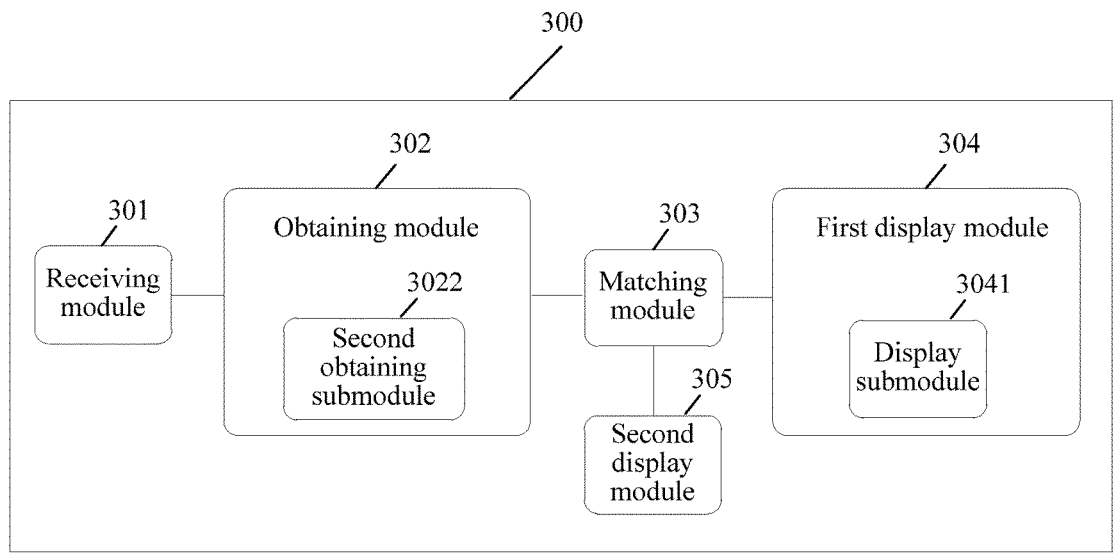

Alternatively, as shown in FIG. 13B, the obtaining module 302 includes a second obtaining submodule 3022 configured to use, as the second fingerprint information, either of the at least two pieces of fingerprint information obtained from the touch operation.

Figure 13C:
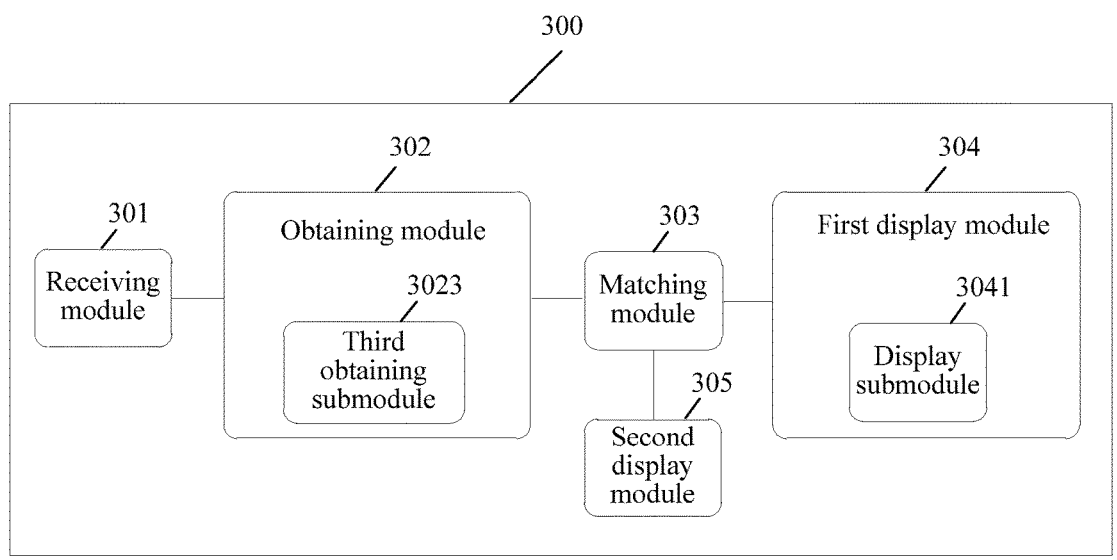

Alternatively, as shown in FIG. 13C, the obtaining module 302 includes a third obtaining submodule 3023 configured to use fingerprint information, obtained from the touch operation, of a recognized finger that earliest comes into contact with the apparatus 300 as the second fingerprint information.

Figure 13D:
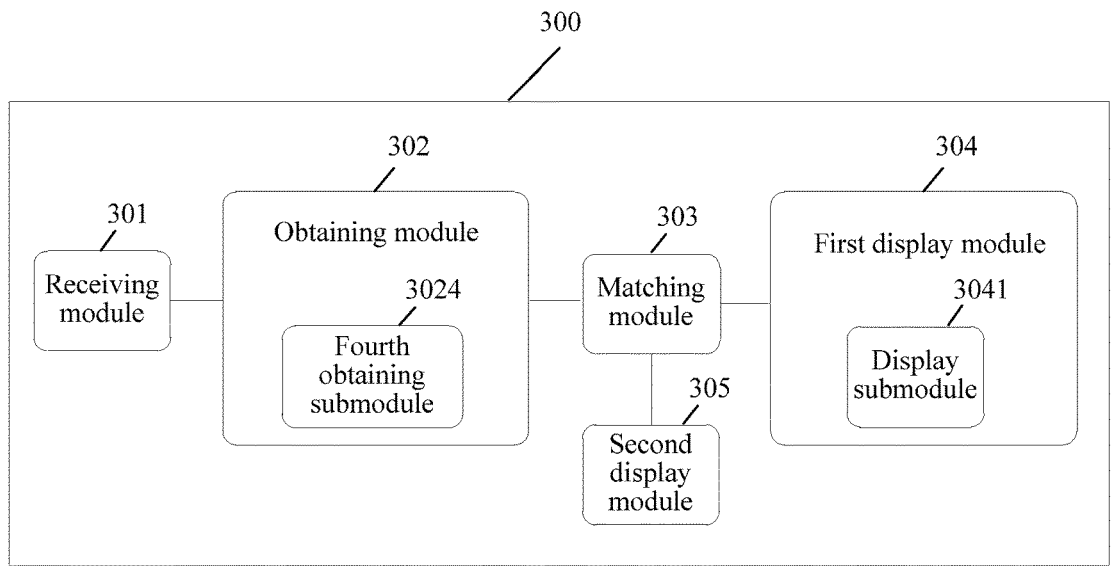

Alternatively, as shown in FIG. 13D, the obtaining module 302 includes a fourth obtaining submodule 3024 configured to use fingerprint information, obtained from the touch operation, of a recognized finger that latest comes into contact with the apparatus 300 as the second fingerprint information.

Figure 13E:
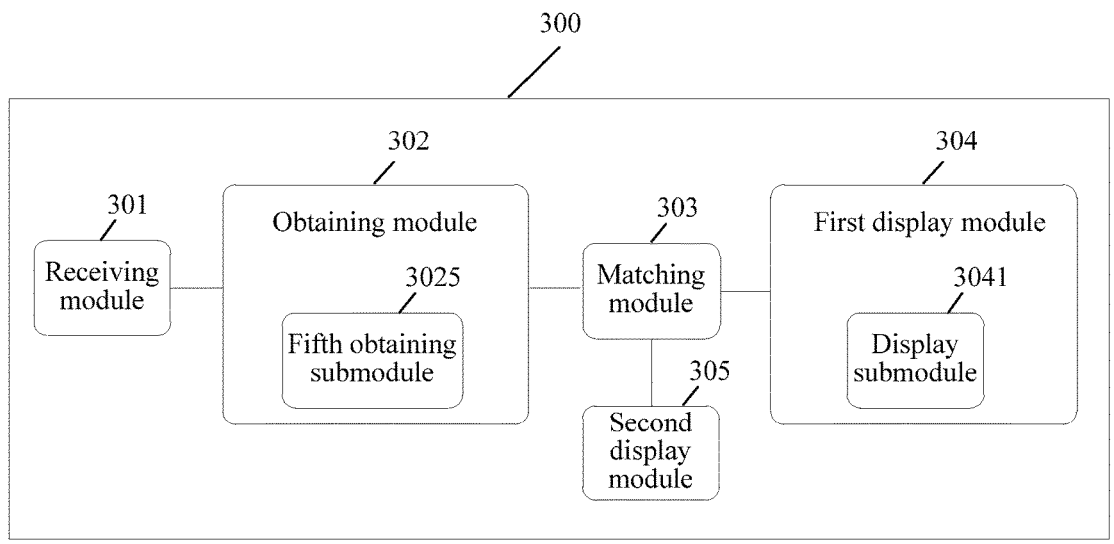

Alternatively, as shown in FIG. 13E, the obtaining module 302 includes a fifth obtaining submodule 3025 configured to use fingerprint information, obtained from the touch operation, of a recognized finger that has a maximum area of contact with the apparatus 300 as the second fingerprint information.

Figure 13F:
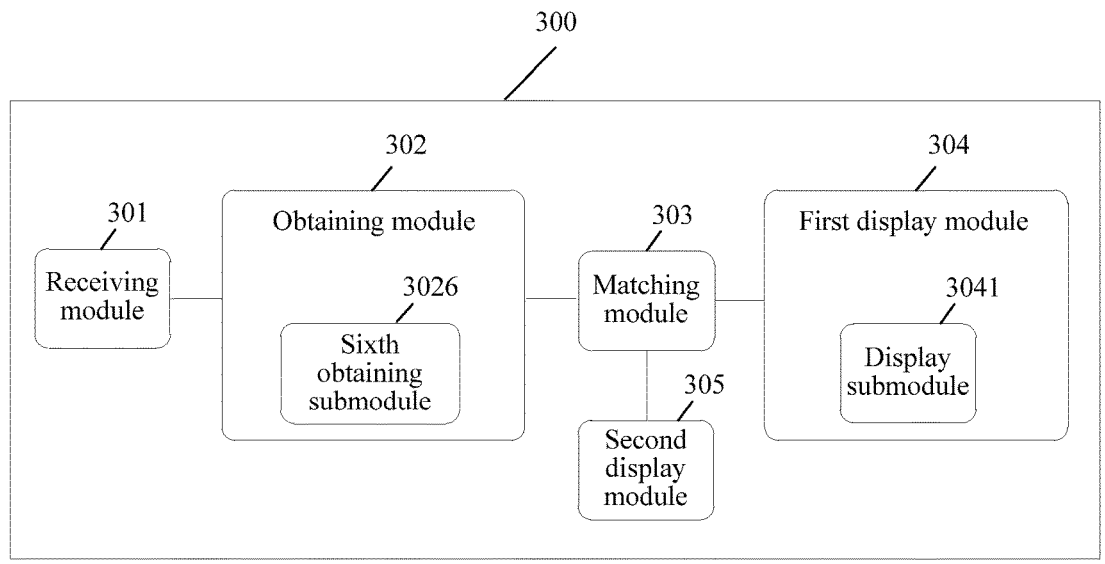

Alternatively, as shown in FIG. 13F, the obtaining module 302 includes a sixth obtaining submodule 3026 configured to use fingerprint information, obtained from the touch operation, of a recognized finger that has a minimum area of contact with the apparatus 300 as the second fingerprint information.

Figure 13G:
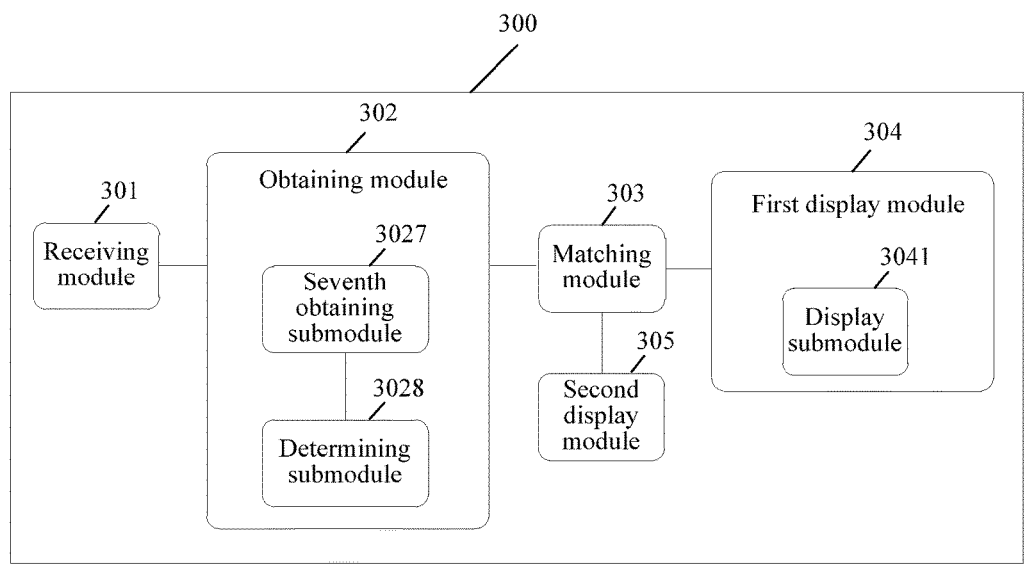

Alternatively, as shown in FIG. 13G, the obtaining module 302 includes a seventh obtaining submodule 3027 and a determining submodule 3028.

The seventh obtaining submodule 3027 is configured to obtain a contact moment, a contact area, and an integrity parameter that correspond to fingerprint information obtained from the touch operation.

The contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information.

The determining submodule 3028 is configured to determine the second fingerprint information according to the contact moment, the contact area, and the integrity parameter.

For the application display apparatus 300 provided in this embodiment of the present disclosure, the apparatus 300 can match second fingerprint information obtained from a touch operation and preset first fingerprint information of an owner user, where a first application can be run when verification against the first fingerprint information is performed, and the apparatus 300 determines, according to a matching result, whether to display the first application. The apparatus 300 determines that the touch operation has a permission to display the first application when the second fingerprint information matches the first fingerprint information, and the apparatus 300 determines that the touch operation does not have a permission to display the first application, or that the touch operation does not have a permission to display the first application clearly when the second fingerprint information does not match the first fingerprint information. In this way, a case in which an application that includes private information of an owner user of the apparatus 300 may be displayed when the apparatus 300 accepts a touch operation of any user is avoided, thereby avoiding a leakage of the private information of the owner user, and reducing an information security risk of the apparatus 300. Meanwhile, the apparatus may flexibly use multiple manners to obtain the second fingerprint information such that the apparatus has larger operation space, and the apparatus can meet more operation requirements.

Figure 14:
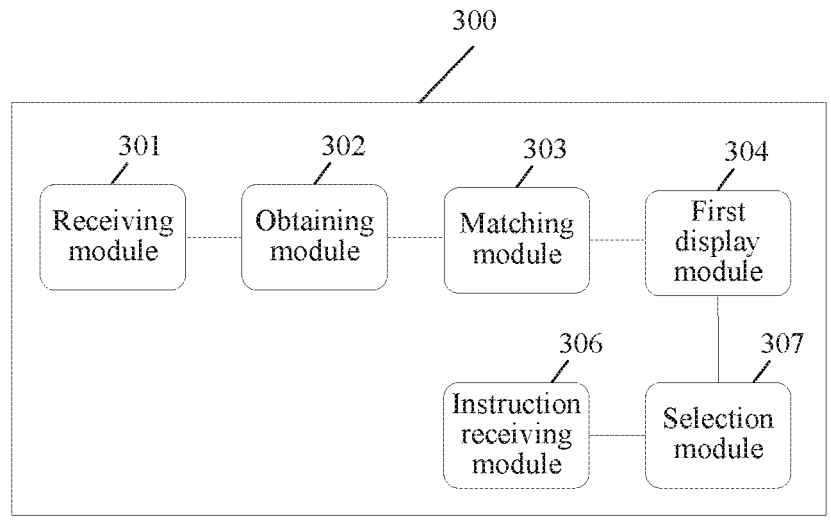
FIG. 14 is a schematic structural diagram of still another specific implementation manner of an application display apparatus according to an embodiment of the present disclosure.

In addition, as shown in FIG. 14, the apparatus 300 further includes an instruction receiving module 306 configured to receive a selection instruction of a user, and a selection module 307 configured to select at least one application as the first application according to the selection instruction.

For the application display apparatus 300 provided in this embodiment of the present disclosure, the apparatus 300 can match second fingerprint information obtained from a touch operation and preset first fingerprint information of an owner user, where a first application can be run when verification against the first fingerprint information is performed, and the apparatus 300 determines, according to a matching result, whether to display the first application. The apparatus 300 determines that the touch operation has a permission to display the first application when the second fingerprint information matches the first fingerprint information, and the apparatus 300 determines that the touch operation does not have a permission to display the first application, or that the touch operation does not have a permission to display the first application clearly when the second fingerprint information does not match the first fingerprint information. In this way, a case in which an application that includes private information of an owner user of the apparatus 300 may be displayed when the apparatus accepts a touch operation of any user is avoided, thereby avoiding a leakage of the private information of the owner user, and reducing an information security risk of the apparatus 300. Moreover, a user may set the first application in a user-defining manner such that the user conveniently sets and manages an application related to private information in the apparatus 300.

Figure 15:
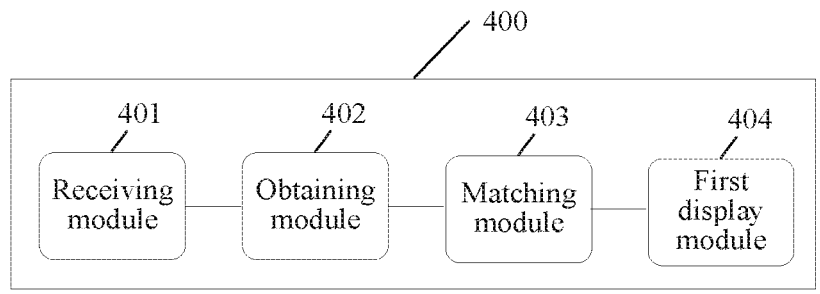
FIG. 15 is a schematic structural diagram of a picture display apparatus according to an embodiment of the present disclosure.

An embodiment of the present disclosure provides a picture display apparatus 400. First fingerprint information is stored in the apparatus 400, a first picture and a second picture are stored in the apparatus 400, and the apparatus 400 currently displays the first picture. Verification against the first fingerprint information needs to be performed to perform an operation of viewing the second picture. As shown in FIG. 15, the apparatus 400 includes a receiving module 401 configured to receive a touch operation, where the touch operation is used to request to display the second picture, an obtaining module 402 configured to obtain second fingerprint information from the touch operation, a matching module 403 configured to match the second fingerprint information and the first fingerprint information, and a first display module 404 configured to display the second picture when the second fingerprint information matches the first fingerprint information.

For the picture display apparatus 400 provided in this embodiment of the present disclosure, in a scenario in which the apparatus 400 can currently display a first picture, the apparatus 400 matches second fingerprint information in a touch operation of a user and preset first fingerprint information of an owner user, where a second picture can be displayed when verification against the first fingerprint information is performed, and the apparatus 400 determines, according to a matching result, whether to display the second picture. The apparatus 400 determines that the touch operation has a permission to switch display of the first picture to display of the second picture when the second fingerprint information matches the first fingerprint information. In this way, a case in which a picture that includes private information of an owner user of the apparatus 400 may be displayed when the apparatus accepts a touch operation of any user is avoided, thereby avoiding a leakage of the private information of the owner user, and reducing an information security risk of the apparatus 400.

Figure 16:
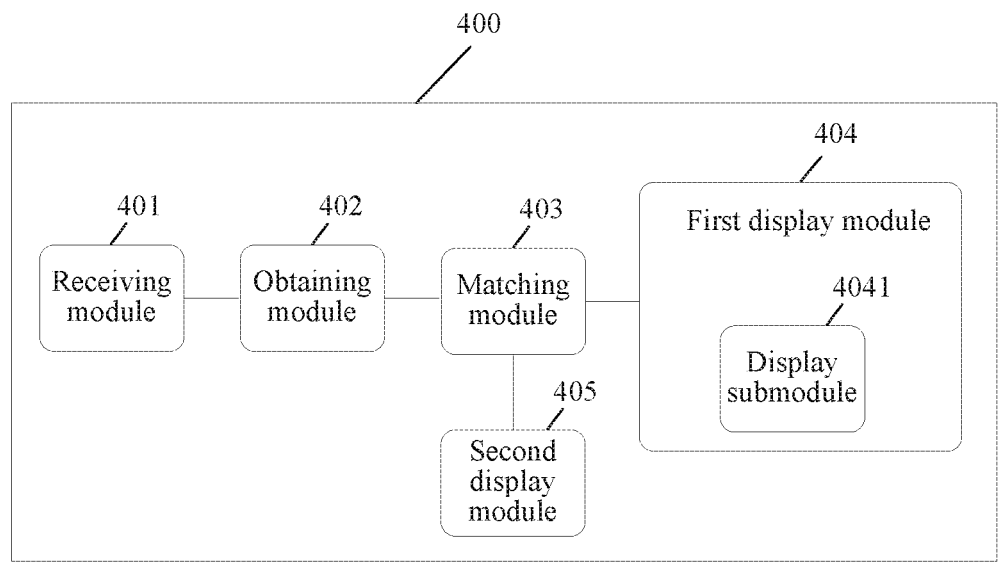
FIG. 16 is a schematic structural diagram of a specific implementation manner of a picture display apparatus according to an embodiment of the present disclosure.

In addition, as shown in FIG. 16, the apparatus 400 further includes a second display module 405 configured to display a third picture and/or the second picture on which blurring processing is performed when the second fingerprint information does not match the first fingerprint information.

Verification against the first fingerprint information does not need to be performed to perform an operation of viewing the third picture.

Further, as shown in FIG. 16, the first display module 404 includes a display submodule 4041 configured to display the second picture and/or basic information of the second picture.

For the picture display apparatus 400 provided in this embodiment of the present disclosure, in a scenario in which the apparatus can currently display a first picture, the apparatus 400 matches second fingerprint information obtained from a touch operation of a user and preset first fingerprint information of an owner user, where a second picture can be displayed when verification against the first fingerprint information is performed, and the apparatus 400 determines, according to a matching result, whether to display the second picture. The apparatus 400 determines that the touch operation has a permission to switch display of the first picture to display of the second picture when the second fingerprint information matches the first fingerprint information, and the apparatus 400 determines that the touch operation does not have a permission to switch display of the first picture to display of the second picture when the second fingerprint information does not match the first fingerprint information. In this way, a case in which a picture that includes private information of an owner user of the apparatus 400 may be displayed when the apparatus 400 accepts a touch operation of any user is avoided, thereby avoiding a leakage of the private information of the owner user, and reducing an information security risk of the apparatus.

Figure 17A:
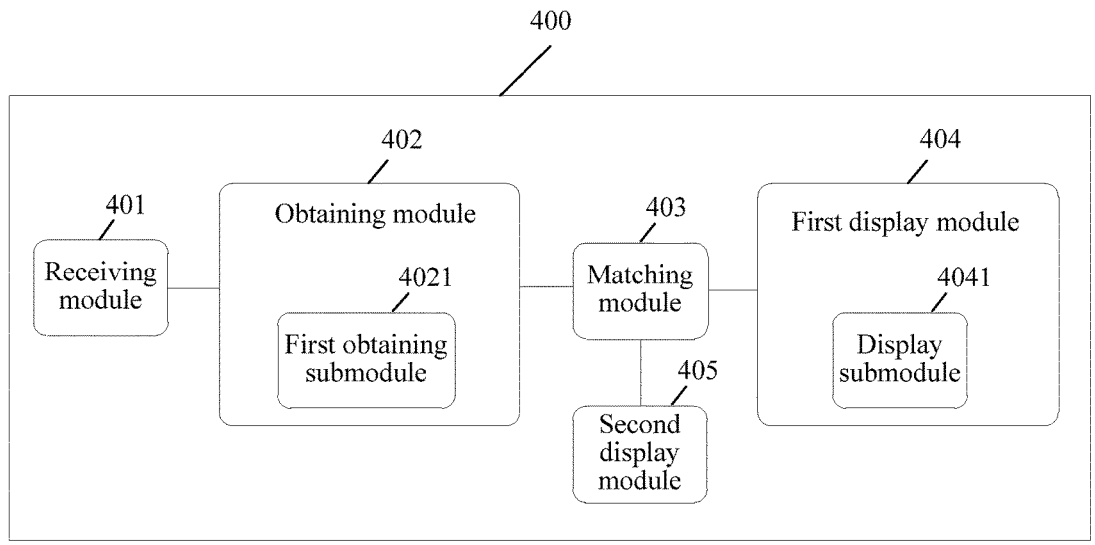
FIG. 17A, FIG. 17B, FIG. 17C, FIG. 17D, FIG. 17E, FIG. 17F, and FIG. 17G are schematic structural diagrams of another specific implementation manner of a picture display apparatus according to an embodiment of the present disclosure.

Further, as shown in FIG. 17A, the obtaining module 402 includes a first obtaining submodule 4021 configured to use, as the second fingerprint information, both the at least two pieces of fingerprint information obtained from the touch operation.

Figure 17B:
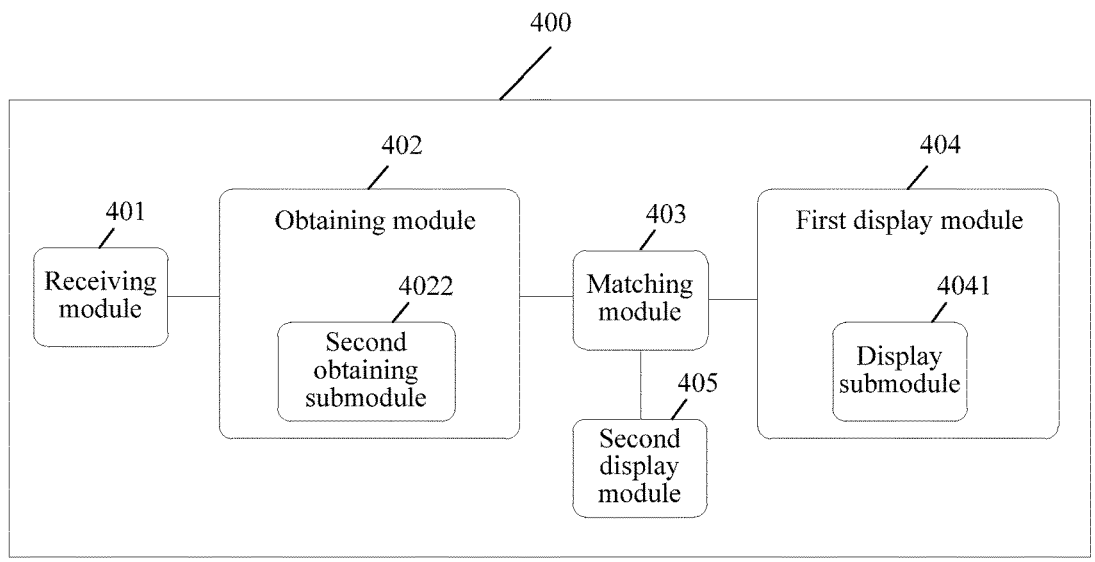

Alternatively, as shown in FIG. 17B, the obtaining module 402 includes a second obtaining submodule 4022 configured to use, as the second fingerprint information, either of the at least two pieces of fingerprint information obtained from the touch operation.

Figure 17C:
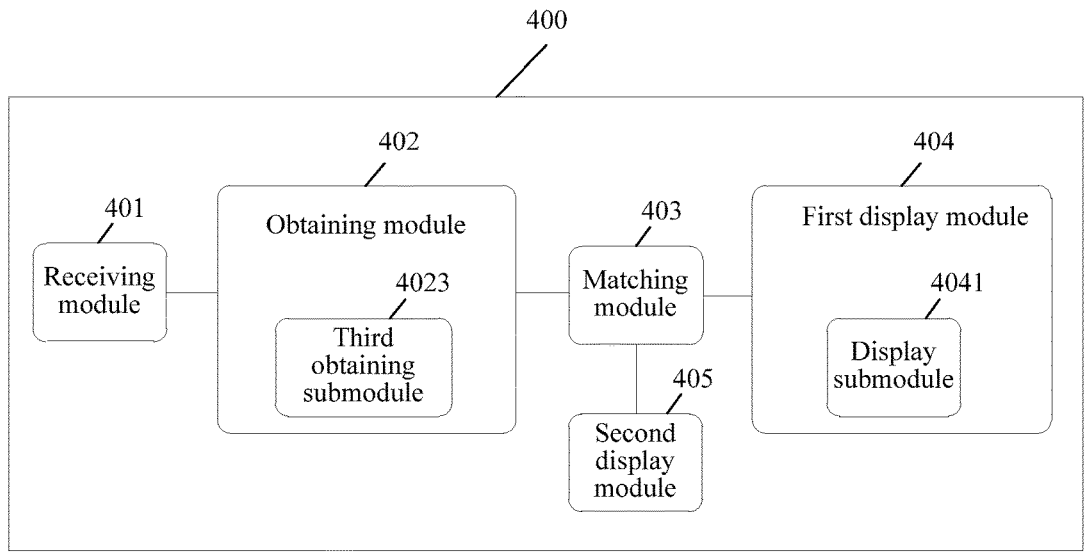

Alternatively, as shown in FIG. 17C, the obtaining module 402 includes a third obtaining submodule 4023 configured to use fingerprint information, obtained from the touch operation, of a recognized finger that earliest comes into contact with the apparatus 400 as the second fingerprint information.

Figure 17D:
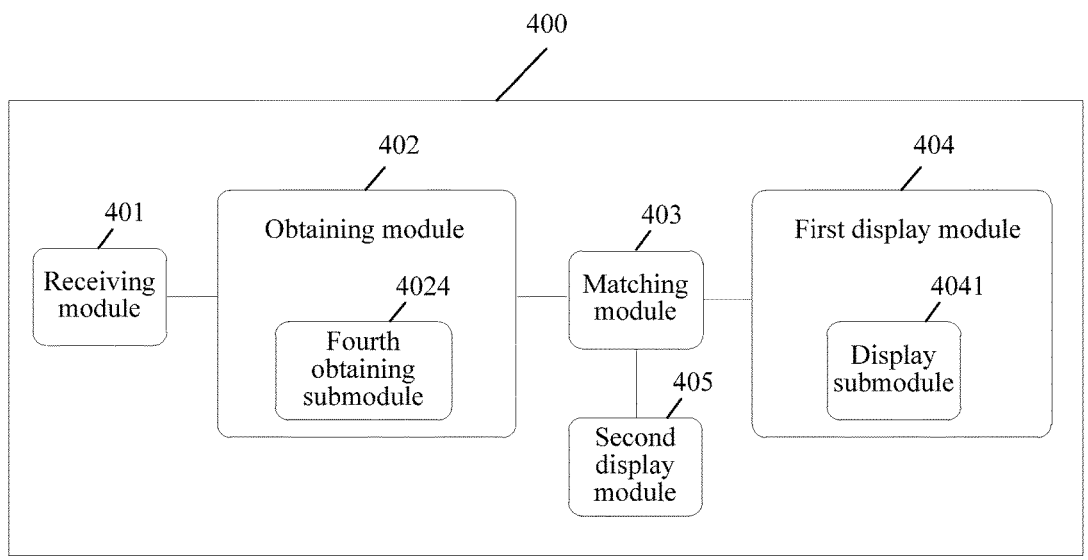

Alternatively, as shown in FIG. 17D, the obtaining module 402 includes a fourth obtaining submodule 4024 configured to use fingerprint information, obtained from the touch operation, of a recognized finger that latest comes into contact with the apparatus 400 as the second fingerprint information.

Figure 17E:
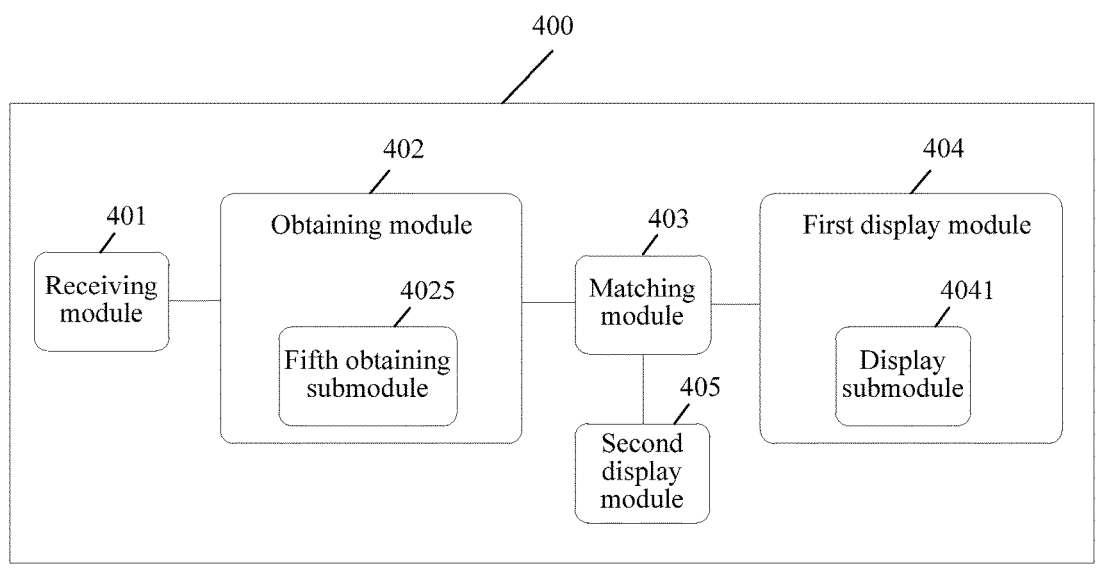

Alternatively, as shown in FIG. 17E, the obtaining module 402 includes a fifth obtaining submodule 4025 configured to use fingerprint information, obtained from the touch operation, of a recognized finger that has a maximum area of contact with the apparatus 400 as the second fingerprint information.

Figure 17F:
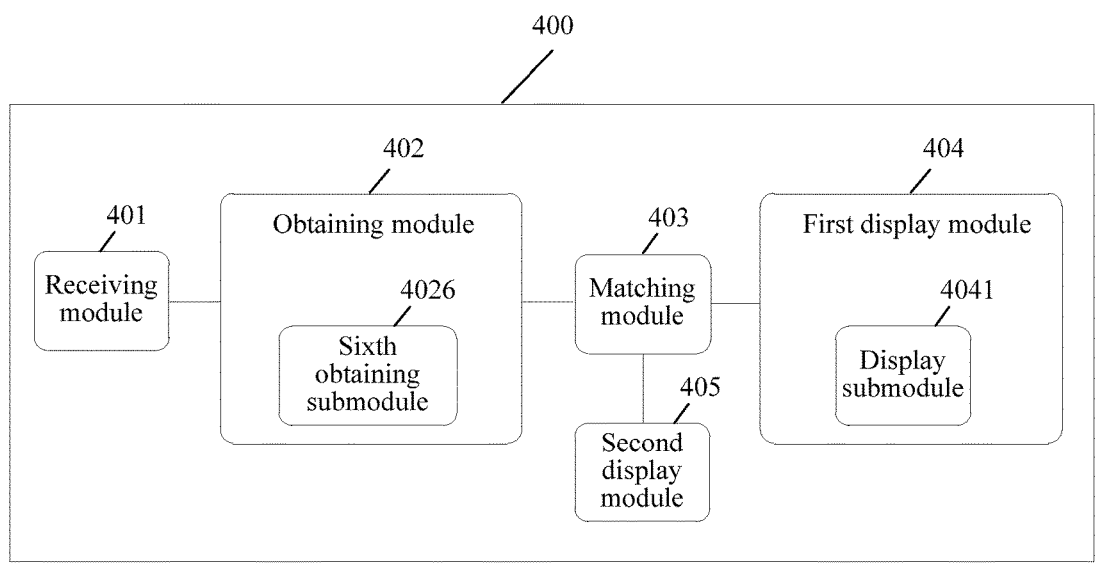

Alternatively, as shown in FIG. 17F, the obtaining module 402 includes a sixth obtaining submodule 4026 configured to use fingerprint information, obtained from the touch operation, of a recognized finger that has a minimum area of contact with the apparatus 400 as the second fingerprint information.

Figure 17G:
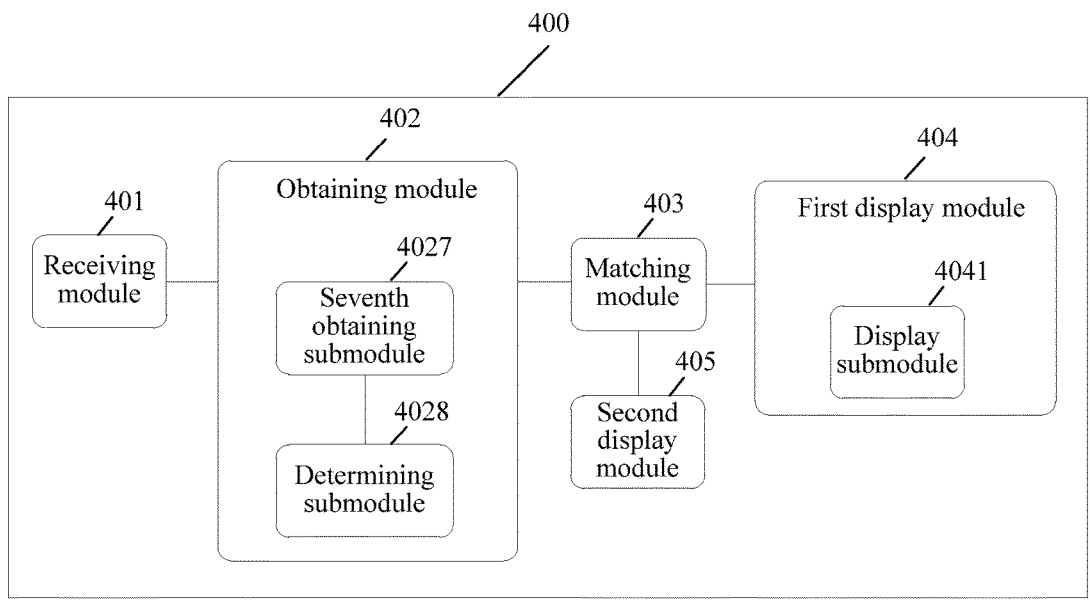

Alternatively, as shown in FIG. 17G, the obtaining module 402 includes a seventh obtaining submodule 4027 and a determining submodule 4028.

The seventh obtaining submodule 4027 is configured to obtain a contact moment, a contact area, and an integrity parameter that correspond to fingerprint information obtained from the touch operation.

The contact moment is a moment when a finger corresponding to the fingerprint information comes into contact with the electronic device, the contact area is an area of contact between the finger corresponding to the fingerprint information and the electronic device, and the integrity parameter represents an integral degree of the fingerprint information.

The determining submodule 4028 is configured to determine the second fingerprint information according to the contact moment, the contact area, and the integrity parameter.

For the picture display apparatus 400 provided in this embodiment of the present disclosure, in a scenario in which the apparatus can currently display a first picture, the apparatus 400 matches second fingerprint information obtained from a touch operation and preset first fingerprint information of an owner user, where a second picture can be displayed when verification against the first fingerprint information is performed, and the apparatus 400 determines, according to a matching result, whether to display the second picture. The apparatus 400 determines that the touch operation has a permission to switch display of the first picture to display of the second picture when the second fingerprint information matches the first fingerprint information, and the apparatus 400 determines that the touch operation does not have a permission to switch display of the first picture to display of the second picture when the second fingerprint information does not match the first fingerprint information. In this way, a case in which a picture that includes private information of an owner user of the apparatus 400 may be displayed when the apparatus 400 accepts a touch operation of any user is avoided, thereby avoiding a leakage of the private information of the owner user, and reducing an information security risk of the apparatus 400. Meanwhile, the apparatus 400 may flexibly use multiple manners to obtain the second fingerprint information such that the apparatus 400 has larger operation space, and the apparatus 400 can meet more operation requirements.

Figure 18:
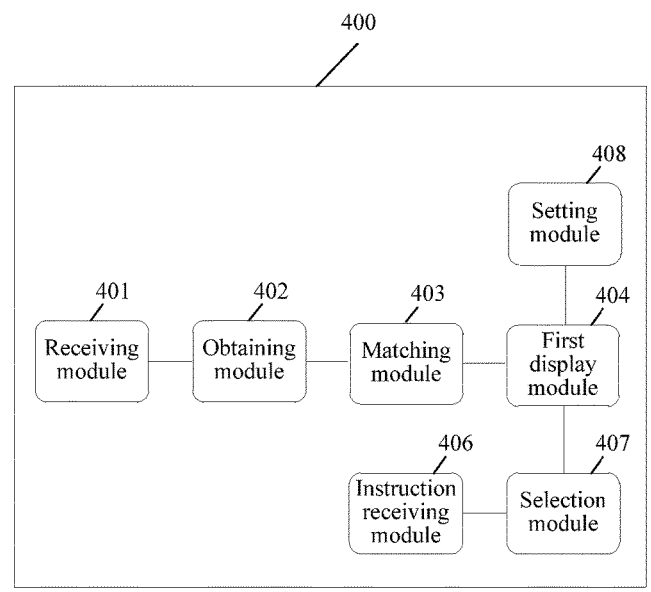
FIG. 18 is a schematic structural diagram of still another specific implementation manner of a picture display apparatus according to an embodiment of the present disclosure.

In addition, as shown in FIG. 18, the apparatus 400 further includes an instruction receiving module 406 configured to receive a selection instruction of a user, and a selection module 407 configured to select at least one picture as the second picture according to the selection instruction, or a setting module 408 configured to set a target photographing function icon, and use, a picture obtained through photographing using the target photographing function icon, as the second picture.

For the picture display apparatus 400 provided in this embodiment of the present disclosure, in a scenario in which the apparatus 400 can currently display a first picture, the apparatus 400 matches second fingerprint information obtained from a touch operation and preset first fingerprint information of an owner user, where a second picture can be displayed when verification against the first fingerprint information is performed, and the apparatus 400 determines, according to a matching result, whether to display the second picture. The apparatus 400 determines that the touch operation has a permission to switch display of the first picture to display of the second picture when the second fingerprint information matches the first fingerprint information, and the apparatus 400 determines that the touch operation does not have a permission to switch display of the first picture to display of the second picture when the second fingerprint information does not match the first fingerprint information. In this way, a case in which a picture that includes private information of an owner user of the apparatus 400 may be displayed when the apparatus 400 accepts a touch operation of any user is avoided, thereby avoiding a leakage of the private information of the owner user, and reducing an information security risk of the apparatus 400. Moreover, a user may set the second picture in a user-defining manner such that the user conveniently sets and manages a picture related to private information in the apparatus 400.

Figure 19:
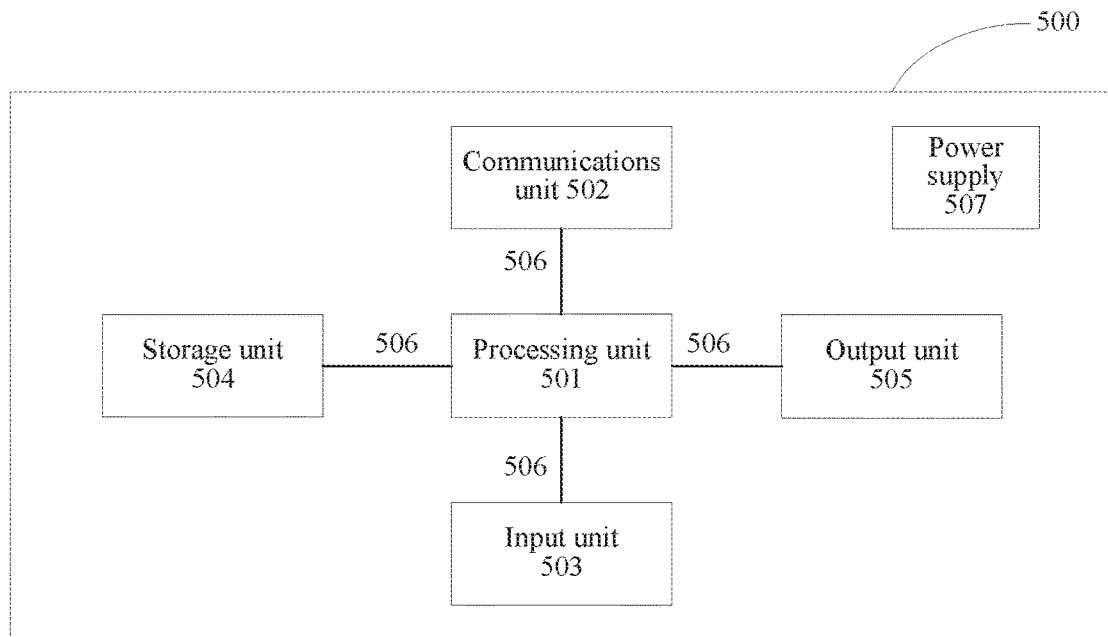
FIG. 19 is a schematic structural diagram of an electronic device according to an embodiment of the present disclosure.

An embodiment of the present disclosure provides an electronic device 500. As shown in FIG. 19, the electronic device 500 includes at least one processing unit 501, for example, the processing unit 501 may be a central processing unit (CPU), at least one communications unit 502 or an input unit 503, a storage unit 504, an output unit 505, at least one communications bus 506, and a power supply 507. The communications bus 506 is configured to implement communication between the foregoing components. The structure of the electronic device 500 shown in FIG. 19 does not constitute a limitation on the present disclosure, and the structure may be a line-shaped structure, or may be a star-shaped structure, or may include more or fewer members than those shown in FIG. 19, or may combine some members, or may have a different arrangement of members.

The processing unit 501 is a control center of the electronic device 500, connects various parts of the entire electronic device 500 using various screens and lines, and runs or executes a software program and/or module stored in the storage unit 504 and invokes data stored in the storage unit 504 to execute various functions of the electronic device 500 and/or process data. The processor 501 may include an integrated circuit (IC), for example, may include a single packaged IC, or may include multiple successive packaged ICs that have same functions or different functions. For example, the processing unit 501 may include only a CPU, or may be a combination of a CPU, a digital signal processor (DSP), a graphic processing unit (GPU), and a control chip (for example, a baseband chip) that is in the communications unit 502. In an implementation manner of the present disclosure, the CPU may be a single computing core or may include multiple computing cores.

The input unit 503 is configured to implement interaction between a user and the electronic device 500 and/or input information to the electronic device 500. For example, an input unit 503 may receive number or character information input by the user to generate signal input related to a user setting or function control. In a specific implementation manner of the present disclosure, the input unit 503 may be a touch panel, or may be another human-computer interaction screen such as a physical input key or a microphone, or may be another external information capturing apparatus such as a camera. The touch panel, which is also referred to as a touchscreen or a touch screen, can collect an operation action of the user on or near the touch panel, for example, an operation action of the user on the touch panel or at a position near the touch panel using any suitable object or accessory such as a finger or a stylus, and drive a corresponding connection apparatus according to a preset program. Optionally, the touch panel may include two parts, a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into coordinates of a touch point, and sends the coordinates to a processing unit 501. The touch controller may further receive and execute a command sent by the processing unit 501. In addition, the touch panel may be a resistive, capacitive, infrared, or surface acoustic wave touch panel. In another implementation manner of the present disclosure, the physical input key used by the input unit 503 may include, but is not limited to, one or more of a physical keyboard, a functional key (such as a volume control key or a switch key), a trackball, a mouse, a joystick, and the like. The input unit 503 in a microphone form may collect speech input by a user or from an environment and converts the speech into a command that is in an electrical signal form and that can be executed by the processing unit 501. The input unit 503 in a fingerprint sensor form may collect body surface print information (including fingerprint information, palm print information, and the like) of a portion at which the user comes into contact with the fingerprint sensor, and convert the body surface print information into a command that is in an electrical signal form and that can be executed by the processing unit 501. The fingerprint sensor may be a capacitive fingerprint sensor, an ultrasonic fingerprint sensor, an optical fingerprint sensor, a temperature fingerprint sensor, or the like, or may be a swipe-type fingerprint sensor or a pressure-sensitive fingerprint sensor. The input unit 503 in an iris sensor form may collect iris information of a user, and convert the iris information into a command that is in an electrical signal form and that can be executed by the processing unit 501. For the iris sensor, the foregoing camera may be reused using a manner for adding a light filter, or a dedicated iris sensor may be separately added.

The output unit 505 may include, but is not limited to, an image output unit, a sound output unit, and a touch sensing output unit. The image output unit is configured to output text, a picture, and/or a video. The image output unit may include a display panel, for example, a display panel that is configured using a form such as a liquid crystal display (LCD), an organic light-emitting diode (OLED), or a field emission display (FED). Alternatively, the image output unit may include a reflective display, such as an electrophoretic display, or a display using a technology of interferometric modulation of light. The image output unit may include a single display or multiple displays of different sizes. In a specific implementation manner of the present disclosure, the touch panel used by the input unit 503 may also be used as a display panel of the output unit at the same time. For example, after detecting a gesture operation of a touch on the touch panel or near the touch panel, the touch panel transfers the gesture operation to the processing unit 501 to determine a type of a touch event. Subsequently, the processing unit 501 provides a corresponding visual output on the display panel according to the type of the touch event. Although in FIG. 19, the input unit 503 and the output unit 505 are two independent members to implement input and output functions of the electronic device 500, in some embodiments, the touch panel and the display panel may be integrated to implement the input and output functions of the electronic device 500. For example, the image output unit may display various graphical user screens (GUI) as virtual control components, which include but are not limited to a window, a scroll, an icon, and a scrapbook such that a user performs an operation in a touch manner. In a specific implementation manner of the present disclosure, the image output unit includes a filter and an amplifier, which are configured to perform filtering and amplification on a video output by the processing unit 501. The audio output unit includes a digital analog converter configured to convert, from a digital format into an analog format, an audio signal output by the processing unit 501.

The communications unit 502 is configured to establish a communications channel such that the electronic device 500 is connected to a communications peer end using the communications channel, and exchanges data with the communications peer end using the communications channel. The communications unit may include a wireless communications module such as a wireless local area network (WLAN) module, a BLUETOOTH module, a near field wireless communication (NFC) module, or a baseband module, and a wired communications module such as an Ethernet module, a universal serial bus (USB) module, or a lightning screen (Lightning, currently used by APPLE Incorporation in a device such as IPHONE5/5s/5c) module. The communications module is configured to perform communication between components in a mobile terminal and the communications peer end, and may support direct memory access.

In different implementation manners of the present disclosure, various communications modules in the communications unit 502 generally appear in a form of an IC chip, and may be combined selectively, but do not need to include all communications modules. For example, the communications unit 502 may include only a baseband chip, a radio frequency chip, and a corresponding antenna to provide a communication function in a cellular communications system. The electronic device 500 may be connected to a cellular network or the Internet by means of a wireless communication connection, for example, WLAN access or wideband code division multiple access (WCDMA) access, established by the communications unit 502. In some optional implementation manners of the present disclosure, the communications module, for example, a baseband module in the communications unit 502 may be integrated in the processing unit 501, typically, for example, an APQ+MDM series platform provided by the QUALCOMM company. A radio frequency circuit is configured to receive and send a signal during an information receiving and sending process or during a call. For example, after downlink information of a base station is received, the downlink information is sent to the processing unit 501 for processing. In addition, uplink-related data is sent to the base station. Generally, the radio frequency circuit includes a well-known circuit configured to execute these functions, and includes, but is not limited to, an antenna system, a radio frequency transceiver, one or more amplifiers, a tuner, one or more oscillators, a digital signal processor, a codec chipset, a subscriber identity module (SIM) card, a memory, and the like. In addition, the radio frequency circuit may further communicate with a network and another device using wireless communication. The wireless communication may use any communication standard or protocol, which includes, but is not limited to, a Global System of Mobile communication (GSM), a general packet radio service (GPRS), Code Division Multiple Access (CDMA), WCDMA, a High Speed Uplink Packet Access technology (HSUPA), Long Term Evolution (LTE), LTE technology-Advanced (LTE-A), and the like.

The storage unit 504 may be configured to store the software program and the module. The processing unit 501 runs the software program and the module stored in the storage unit 504 in order to execute various functional applications of the electronic device 500 and implement data processing. The storage unit 504 mainly includes a program storage area and a data storage area, where the program storage area may store an operating system and an application program such as a sound playback program and an image display program needed for at least one function, and the data storage area may store data (for example, audio data and a phone book) and the like created according to use of the mobile terminal. In a specific implementation manner of the present disclosure, the storage unit 504 may include a volatile memory, such as a nonvolatile dynamic random access memory (NVRAM), a phase change random access memory (PRAM), or a magnetoresistive random access memory (MRAM), or may include a nonvolatile memory, such as at least one magnetic storage device, an electrically erasable programmable read-only memory (EEPROM), or a flash memory, for example, a NOR flash memory or a NAND flash memory. The nonvolatile memory stores the operating system and the application program executed by the processing unit 501. The processing unit 501 loads a running program and data from the nonvolatile into memory and stores digital content in massive storage apparatuses. The operating system includes various components and/or drivers that are used to control and manage conventional system tasks, such as memory management, storage device control, and power management, and to facilitate communication between various types of software and hardware. In an implementation manner of the present disclosure, the operating system may be an ANDROID system from the GOOGLE Incorporation, an IOS system developed by the APPLE Incorporation, or a WINDOWS operating system developed by the MICROSOFT Corporation, or an embedded operating system such as VXWORKS. The application program includes any application installed on the electronic device 500, and includes, but is not limited to, an application such as a browser, electronic mail, an instant messaging service, text processing, a virtual keyboard, a widget, encryption, digital copyright management, speech recognition, speech duplication, positioning (for example, a function provided by a global positioning system), and music playback.

The power supply 507 is configured to supply power to different members of the electronic device 500 to maintain operation of the electronic device 500. It is generally understood that the power supply 507 may be a built-in battery such as a common lithium ion battery and a common nickel-hydrogen battery, or includes an external power supply such as an alternating current (AC) adapter that directly supplies power to the electronic device 500. In some implementation manners of the present disclosure, the power supply 507 may further have wider definitions, for example, may further include a power supply management system, a charging system, a power supply failure detection circuit, a power supply converter or inverter, a power supply status indicator (for example, a light-emitting diode), and any other component that is related to generation, management, and distribution of electrical energy of the mobile terminal.

Further, the input unit 503 is configured to receive a touch operation.

The touch operation is used to request to display an application switch screen.

The processing unit 501 is configured to obtain second fingerprint information from the touch operation, and is configured to match the second fingerprint information and the first fingerprint information.

The output unit 505 is configured to display a first application in the application switch screen when the second fingerprint information matches the first fingerprint information.

The output unit 505 is further configured to display, in the application switch screen, a second application and/or the first application on which blurring processing is performed when the second fingerprint information does not match the first fingerprint information, where verification against the first fingerprint information does not need to be performed to run the second application.

The output unit 505 is further configured to display a screen thumbnail of the first application and/or basic information of the first application in the application switch screen.

The processing unit 501 is further configured to use, as the second fingerprint information, both the at least two pieces of fingerprint information obtained from the touch operation, use, as the second fingerprint information, either of the at least two pieces of fingerprint information obtained from the touch operation, use fingerprint information, obtained from the touch operation, of a recognized finger that earliest comes into contact with the electronic device 500 as the second fingerprint information, use fingerprint information, obtained from the touch operation, of a recognized finger that latest comes into contact with the electronic device 500 as the second fingerprint information, use fingerprint information, obtained from the touch operation, of a recognized finger that has a maximum area of contact with the electronic device 500 as the second fingerprint information, use fingerprint information, obtained from the touch operation, of a recognized finger that has a minimum area of contact with the electronic device 500 as the second fingerprint information, or obtain a contact moment, a contact area, and an integrity parameter that correspond to fingerprint information obtained from the touch operation, where the contact moment is a moment when a finger corresponding to the fingerprint information comes into contact with the electronic device 500, the contact area is an area in which the finger corresponding to the fingerprint information comes into contact with the electronic device 500, and the integrity parameter represents an integral degree of the fingerprint information, and determine the second fingerprint information according to the contact moment, the contact area, and the integrity parameter.

The input unit 503 is further configured to receive a selection instruction of a user.

The processing unit 501 is further configured to select at least one application as the first application according to the selection instruction.

For the electronic device 500 provided in this embodiment of the present disclosure, the electronic device 500 can match second fingerprint information obtained from a touch operation and preset first fingerprint information of an owner user, where a first application can be run when verification against the first fingerprint information is performed, and the electronic device 500 determines, according to a matching result, whether to display the first application, the electronic device 500 determines that the touch operation has a permission to display the first application when the second fingerprint information matches the first fingerprint information, the electronic device 500 determines that the touch operation does not have a permission to display the first application and when the second fingerprint information does not match the first fingerprint information. In this way, a case in which an application that includes private information of an owner user of an electronic device may be displayed when the electronic device 500 accepts a touch operation of any user is avoided, thereby avoiding a leakage of the private information of the owner user, and reducing an information security risk of the electronic device 500. Meanwhile, the electronic device may flexibly use multiple manners to obtain the second fingerprint information such that the electronic device 500 has larger operation space, and the electronic device 500 can meet more operation requirements. Moreover, a user may set the first application in a user-defining manner such that the user conveniently sets and manages an application related to private information in the electronic device 500.

Figure 20:
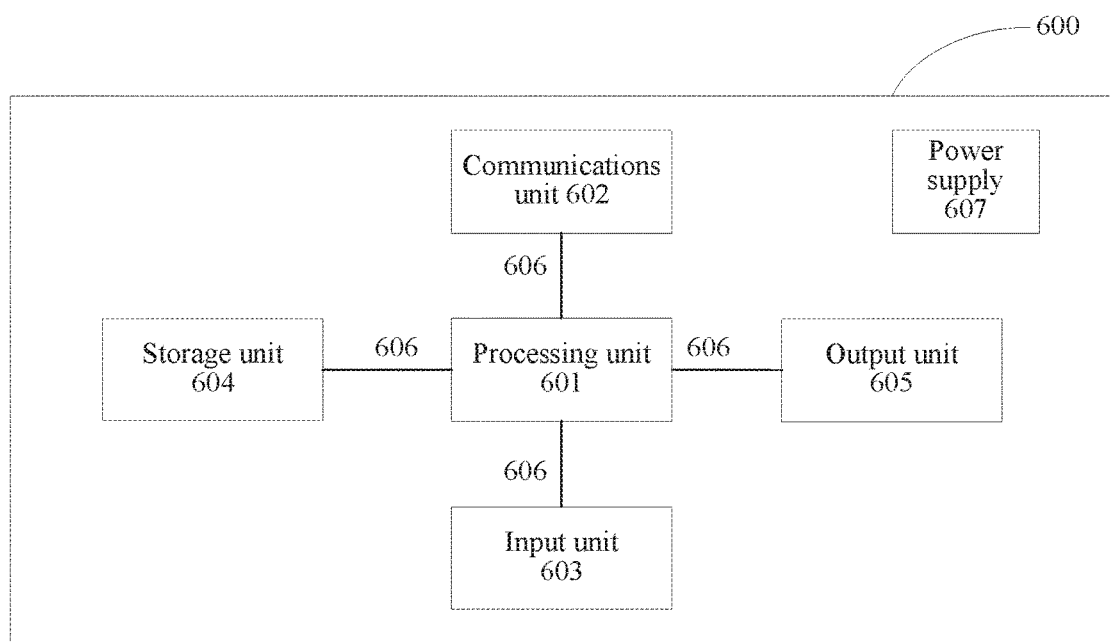
FIG. 20 is a schematic structural diagram of an electronic device according to an embodiment of the present disclosure.

An embodiment of the present disclosure provides an electronic device 600. As shown in FIG. 20, the electronic device 600 includes at least one processing unit 601, for example, a CPU, at least one communications unit 602 or another input unit 603, a storage unit 604, an output unit 605, at least one communications bus 606, and a power supply 607. The communications bus 606 is configured to implement communication between the foregoing components. The structure of the electronic device 600 shown in FIG. 20 does not constitute a limitation on the present disclosure, and the structure may be a line-shaped structure, or may be a star-shaped structure, or may include more or fewer members than those shown in FIG. 20, or may combine some members, or may have a different arrangement of members.

The processing unit 601 is a control center of the electronic device 600, connects various parts of the entire electronic device 600 using various screens and lines, and runs or executes a software program and/or module stored in the storage unit 604 and invokes data stored in the storage unit 604 to execute various functions of the electronic device 600 and/or process data. The processor 601 may include an IC, for example, may include a single packaged IC, or may include multiple successive packaged ICs that have same functions or different functions. For example, the processing unit 601 may include only a CPU, or may be a combination of a CPU, a DSP, a GPU, and a control chip (for example, a baseband chip) that is in the communications unit 602. In an implementation manner of the present disclosure, the CPU may be a single computing core or may include multiple computing cores.

The input unit 603 is configured to implement interaction between a user and the electronic device 600 and/or input information to the electronic device 600. For example, an input unit 603 may receive number or character information input by the user to generate signal input related to a user setting or function control. In a specific implementation manner of the present disclosure, the input unit 603 may be a touch panel, or may be another human-computer interaction screen such as a physical input key or a microphone, or may be another external information capturing apparatus such as a camera. The touch panel, which is also referred to as a touchscreen or a touch screen, can collect an operation action of the user on or near the touch panel, for example, an operation action of the user on the touch panel or at a position near the touch panel using any suitable object or accessory such as a finger or a stylus, and drive a corresponding connection apparatus according to a preset program. Optionally, the touch panel may include two parts, a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into coordinates of a touch point, and sends the coordinates to a processing unit 601. The touch controller may further receive and execute a command sent by the processing unit 601. In addition, the touch panel may be a resistive, capacitive, infrared, or surface acoustic wave touch panel. In another implementation manner of the present disclosure, the physical input key used by the input unit 603 may include, but is not limited to, one or more of a physical keyboard, a functional key (such as a volume control key or a switch key), a trackball, a mouse, a joystick, and the like. The input unit 603 in a microphone form may collect speech input by a user or from an environment and converts the speech into a command that is in an electrical signal form and that can be executed by the processing unit 601. The input unit 603 in a fingerprint sensor form may collect body surface print information (including fingerprint information, palm print information, and the like) of a portion at which the user comes into contact with the fingerprint sensor, and convert the body surface print information into a command that is in an electrical signal form and that can be executed by the processing unit 601. The fingerprint sensor may be a capacitive fingerprint sensor, an ultrasonic fingerprint sensor, an optical fingerprint sensor, a temperature fingerprint sensor, or the like, or may be a swipe-type fingerprint sensor or a pressure-sensitive fingerprint sensor. The input unit 603 in an iris sensor form may collect iris information of a user, and convert the iris information into a command that is in an electrical signal form and that can be executed by the processing unit 601. For the iris sensor, the foregoing camera may be reused using a manner for adding a light filter, or a dedicated iris sensor may be separately added.

The output unit 605 may include, but is not limited to, an image output unit, a sound output unit, and a touch sensing output unit. The image output unit is configured to output text, a picture, and/or a video. The image output unit may include a display panel, for example, a display panel that is configured using a form such as an LCD, an OLED, or a FED. Alternatively, the image output unit may include a reflective display, such as an electrophoretic display, or a display using a technology of interferometric modulation of light. The image output unit may include a single display or multiple displays of different sizes. In a specific implementation manner of the present disclosure, the touch panel used by the input unit 603 may also be used as a display panel of the output unit 605 at the same time. For example, after detecting a gesture operation of a touch on the touch panel or near the touch panel, the touch panel transfers the gesture operation to the processing unit 601 to determine a type of a touch event. Subsequently, the processing unit 601 provides a corresponding visual output on the display panel according to the type of the touch event. Although in FIG. 20, the input unit 603 and the output unit 605 are two independent members to implement input and output functions of the electronic device 600, in some embodiments, the touch panel and the display panel may be integrated to implement the input and output functions of the electronic device 600. For example, the image output unit may display various GUIs as virtual control components, which include but are not limited to a window, a scroll, an icon, and a scrapbook such that a user performs an operation in a touch manner. In a specific implementation manner of the present disclosure, the image output unit includes a filter and an amplifier, which are configured to perform filtering and amplification on a video output by the processing unit 601. The audio output unit includes a digital analog converter configured to convert, from a digital format into an analog format, an audio signal output by the processing unit 601.

The communications unit 602 is configured to establish a communications channel such that the electronic device 600 is connected to a communications peer end using the communications channel, and exchanges data with the communications peer end using the communications channel. The communications unit may include a wireless communications module such as WLAN module, a BLUETOOTH module, an NFC module, or a baseband module, and a wired communications module such as an Ethernet module, a USB module, or a lightning screen (Lightning, currently used by APPLE Incorporation in a device such as IPHONE5/5s/5c) module. The communications module is configured to perform communication between components in a mobile terminal and the communications peer end, and may support direct memory access.

In different implementation manners of the present disclosure, various communications modules in the communications unit 602 generally appear in a form of an IC chip, and may be combined selectively, but do not need to include all communications modules. For example, the communications unit 602 may include only a baseband chip, a radio frequency chip, and a corresponding antenna to provide a communication function in a cellular communications system. The electronic device 600 may be connected to a cellular network or the Internet by means of a wireless communication connection, for example, WLAN access or WCDMA access, established by the communications unit 602. In some optional implementation manners of the present disclosure, the communications module, for example, a baseband module in the communications unit 602 may be integrated in the processing unit 601, typically, for example, an APQ+MDM series platform provided by the QUALCOMM company. A radio frequency circuit is configured to receive and send a signal during an information receiving and sending process or during a call. For example, after downlink information of a base station is received, the downlink information is sent to the processing unit 601 for processing. In addition, uplink-related data is sent to the base station. Generally, the radio frequency circuit includes a well-known circuit configured to execute these functions, and includes, but is not limited to, an antenna system, a radio frequency transceiver, one or more amplifiers, a tuner, one or more oscillators, a digital signal processor, a codec chipset, a SIM card, a memory, and the like. In addition, the radio frequency circuit may further communicate with a network and another device using wireless communication. The wireless communication may use any communication standard or protocol, which includes, but is not limited to, a GSM, a GPRS, CDMA, WCDMA, an HSUPA, an LTE, an LTE-A, and the like.

The storage unit 604 may be configured to store the software program and the module. The processing unit 601 runs the software program and the module stored in the storage unit 604 in order to execute various functional applications of the electronic device 600 and implement data processing. The storage unit 604 mainly includes a program storage area and a data storage area, where the program storage area may store an operating system and an application program such as a sound playback program and an image display program needed for at least one function, and the data storage area may store data (for example, audio data and a phone book) and the like created according to use of the mobile terminal. In a specific implementation manner of the present disclosure, the storage unit may include a volatile memory, such as an NVRAM, a PRAM, or an MRAM, or may include a nonvolatile memory, such as at least one magnetic storage device, an EEPROM, or a flash memory, for example, a NOR flash memory or a NAND flash memory. The nonvolatile memory stores the operating system and the application program executed by the processing unit 601. The processing unit 601 loads a running program and data from the nonvolatile into memory and stores digital content in massive storage apparatuses. The operating system includes various components and/or drivers that are used to control and manage conventional system tasks, such as memory management, storage device control, and power management, and to facilitate communication between various types of software and hardware. In an implementation manner of the present disclosure, the operating system may be an ANDROID system from the GOOGLE Incorporation, an IOS system developed by the APPLE Incorporation or a WINDOWS operating system developed by the MICROSOFT Corporation, or an embedded operating system such as WXWORKS. The application program includes any application installed on the electronic device 600, and includes, but is not limited to, an application such as a browser, electronic mail, an instant messaging service, text processing, a virtual keyboard, a widget, encryption, digital copyright management, speech recognition, speech duplication, positioning (for example, a function provided by a global positioning system), and music playback.

The power supply 607 is configured to supply power to different members of the electronic device 600 to maintain operation of the electronic device 600. It is generally understood that the power supply 607 may be a built-in battery such as a common lithium ion battery and a common nickel-hydrogen battery, or includes an external power supply such as an AC adapter that directly supplies power to the electronic device 600. In some implementation manners of the present disclosure, the power supply 607 may further have wider definitions, for example, may further include a power supply management system, a charging system, a power supply failure detection circuit, a power supply converter or inverter, a power supply status indicator (for example, an LED), and any other component that is related to generation, management, and distribution of electrical energy of the mobile terminal.

Further, the input unit 603 is configured to receive a touch operation.

The touch operation is used to request to display a second picture.

The processing unit 601 is configured to obtain second fingerprint information from the touch operation, and is configured to match the second fingerprint information and first fingerprint information.

The output unit 605 is configured to display the second picture when the second fingerprint information matches the first fingerprint information.

Further, the output unit 605 is further configured to display a third picture and/or the second picture on which blurring processing is performed when the second fingerprint information does not match the first fingerprint information, where verification against the first fingerprint information does not need to be performed to perform an operation of viewing the third picture.

Further, the output unit 605 further includes displaying the second picture and/or basic information of the second picture.

Further, the processing unit 601 is further configured to use, as the second fingerprint information, both the at least two pieces of fingerprint information obtained from the touch operation, use, as the second fingerprint information, either of the at least two pieces of fingerprint information obtained from the touch operation, use fingerprint information, obtained from the touch operation, of a recognized finger that earliest comes into contact with the electronic device 600 as the second fingerprint information, use fingerprint information, obtained from the touch operation, of a recognized finger that latest comes into contact with the electronic device 600 as the second fingerprint information, use fingerprint information, obtained from the touch operation, of a recognized finger that has a maximum area of contact with the electronic device 600 as the second fingerprint information, use fingerprint information, obtained from the touch operation, of a recognized finger that has a minimum area of contact with the electronic device 600 as the second fingerprint information, or obtain a contact moment, a contact area, and an integrity parameter that correspond to fingerprint information obtained from the touch operation, where the contact moment is a moment when a finger corresponding to the fingerprint information comes into contact with the electronic device 600, the contact area is an area in which the finger corresponding to the fingerprint information comes into contact with the electronic device 600, and the integrity parameter represents an integral degree of the fingerprint information, and determine the second fingerprint information according to the contact moment, the contact area, and the integrity parameter.

The input unit 603 is further configured to receive a selection instruction of a user.

The processing unit 601 is further configured to select at least one picture as the second picture according to the selection instruction.

Alternatively, the processing unit 601 is further configured to set a target photographing function icon, and use, a picture obtained through photographing using the target photographing function icon, as the second picture.

For the electronic device 600 provided in this embodiment of the present disclosure, in a scenario in which the electronic device 600 can currently display a first picture, the electronic device 600 matches second fingerprint information obtained from a touch operation of a user and preset first fingerprint information of an owner user, where a second picture can be displayed when verification against the first fingerprint information is performed, and the electronic device 600 determines, according to a matching result, whether to display the second picture, when the second fingerprint information matches the first fingerprint information, the electronic device 600 determines that the touch operation has a permission to switch display of the first picture to display of the second picture, and when the second fingerprint information does not match the first fingerprint information, the electronic device 600 determines that the touch operation does not have a permission to switch display of the first picture to display of the second picture. In this way, a case in which a picture that includes private information of an owner user of an electronic device 600 may be displayed when the electronic device 600 accepts a touch operation of any user is avoided, thereby avoiding a leakage of the private information of the owner user, and reducing an information security risk of the electronic device 600. Meanwhile, the electronic device 600 may flexibly use multiple manners to obtain the second fingerprint information such that the electronic device 600 has larger operation space, and the electronic device 600 can meet more operation requirements. Moreover, a user may set the second picture in a user-defining manner such that the user conveniently sets and manages a picture related to private information in the electronic device 600.

The embodiments in this specification are all described in a progressive manner, for same or similar parts in the embodiments, refer to these embodiments, and each embodiment focuses on a difference from other embodiments. Especially, a device embodiment is basically similar to a method embodiment, and therefore is described briefly. For related parts, refer to partial descriptions in the method embodiment.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disk, an optical disc, a read-only memory (ROM), a random access memory (RAM), or the like.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An application display method applied to an electronic device, the method comprising:
receiving, by the electronic device, a touch operation requesting to display an application switch screen, the electronic device storing first fingerprint information, the electronic device having a first application installed thereon, and running the first application requires performing verification against the first fingerprint information;
obtaining second fingerprint information from the touch operation, wherein at least two pieces of fingerprint information are obtained from the touch operation, and obtaining the second fingerprint information from the touch operation comprises:
  setting both of the at least two pieces of fingerprint information obtained from the touch operation as the second fingerprint information; or
  setting either of the at least two pieces of fingerprint information obtained from the touch operation as the second fingerprint information; or
  setting fingerprint information, obtained from the touch operation, of a recognized finger that earliest comes into contact with the electronic device as the second fingerprint information; or
  setting fingerprint information, obtained from the touch operation, of a recognized finger that latest comes into contact with the electronic device as the second fingerprint information; or
  setting fingerprint information, obtained from the touch operation, of a recognized finger that has a maximum area of contact with the electronic device as the second fingerprint information; or
  setting fingerprint information, obtained from the touch operation, of a recognized finger that has a minimum area of contact with the electronic device as the second fingerprint information; or
  performing:
    obtaining a contact moment, a contact area, and an integrity parameter corresponding to fingerprint information obtained from the touch operation, wherein the contact moment is a moment when a finger corresponding to the fingerprint information comes into contact with the electronic device, the contact area is an area in which the finger corresponding to the fingerprint information comes into contact with the electronic device, and the integrity parameter represents an integral degree of the fingerprint information; and
    determining the second fingerprint information according to the contact moment, the contact area, and the integrity parameter;
  matching the second fingerprint information and the first fingerprint information; and
  displaying the first application in the application switch screen when the second fingerprint information matches the first fingerprint information.

2. The method of claim 1, further comprising displaying, in the application switch screen, either a second application or the first application on which blur processing is performed when the second fingerprint information does not match the first fingerprint information, and wherein verification against the first fingerprint information does not need to be performed to run the second application.

3. The method of claim 1, wherein displaying the first application in the application switch screen comprises displaying a screen thumbnail of the first application and basic information of the first application in the application switch screen.

4. The method of claim 1, wherein before receiving the touch operation, the method further comprises:
  receiving a selection instruction of a user; and
  selecting at least one application as the first application according to the selection instruction.

5. The method of claim 1, wherein displaying the first application in the application switch screen comprises displaying a screen thumbnail of the first application in the application switch screen.

6. The method of claim 1, wherein displaying the first application in the application switch screen comprises displaying basic information of the first application in the application switch screen.

7. A picture display method applied to an electronic device that stores a first picture and a second picture, the method comprising:
  displaying the first picture:
  receiving a touch operation requesting to display the second picture, the electronic device storing first fingerprint information, and viewing the second picture requires performing verification against the first fingerprint information;
  obtaining second fingerprint information from the touch operation, wherein at least two pieces of fingerprint information are obtained from the touch operation, and obtaining the second fingerprint information from the touch operation comprises:
    setting both of the at least two pieces of fingerprint information obtained from the touch operation as the second fingerprint information; or
    setting either of the at least two pieces of fingerprint information obtained from the touch operation as the second fingerprint information; or
    setting fingerprint information, obtained from the touch operation, of a recognized finger that earliest comes into contact with the electronic device as the second fingerprint information; or
    setting fingerprint information, obtained from the touch operation, of a recognized finger that latest comes into contact with the electronic device as the second fingerprint information; or
    setting fingerprint information, obtained from the touch operation, of a recognized finger that has a maximum area of contact with the electronic device as the second fingerprint information; or
    setting fingerprint information, obtained from the touch operation, of a recognized firmer that has a minimum area of contact with the electronic device as the second fingerprint information; or
    performing:
      obtaining a contact moment, a contact area, and an integrity parameter corresponding to fingerprint information obtained from the touch operation, wherein the contact moment is a moment when a finger corresponding to the fingerprint information comes into contact with the electronic device, wherein the contact area is an area in which the finger corresponding to the fingerprint information comes into contact with the electronic device, and wherein the integrity parameter represents an integral degree of the fingerprint information; and
      determining the second fingerprint information according to the contact moment, the contact area, and the integrity parameter;
  matching the second fingerprint information and the first fingerprint information; and
  displaying the second picture When the second fingerprint information matches the first fingerprint information.

8. The method of claim 7, further comprising displaying either a third picture or the second picture on which blur processing is performed when the second fingerprint information does not match the first fingerprint information, and wherein verification against the first fingerprint information does not need to he performed to perform an operation of viewing the third picture.

9. The method of claim 7, wherein displaying the second picture comprises displaying the second picture and basic information of the second picture.

10. The method of claim 7, wherein before receiving the touch operation, the method further comprises:
receiving a selection instruction of a user; and
selecting at least one picture as the second picture according to the selection instruction.

11. The method of claim 7, wherein displaying the second picture comprises displaying only the second picture.

12. The method of claim 7, wherein displaying the second picture comprises displaying basic information of the second picture.

13. The method of claim 7, wherein before receiving the touch operation, the method further comprises:
setting a target photographing function icon; and
setting a picture obtained through photographing using the target photographing function icon as the second picture.

14. An electronic device on which a first application is installed, the electronic device storing first fingerprint information against which verification needs to be performed to run the first application, and the electronic device comprising:
an input component configured to receive a touch operation requesting to display an application switch screen;
a processor coupled to the input component and configured to:
obtain second fingerprint information from the touch operation, wherein at least two pieces of fingerprint information are obtained from the touch operation, and the processor is further configured to:
set both of the at least two pieces of fingerprint information obtained from the touch operation as the second fingerprint information; or
set either of the at least two pieces of fingerprint information obtained from the touch operation as the second fingerprint information; or
set fingerprint information, obtained from the touch operation, of a recognized finger that earliest comes into contact with the electronic device as the second fingerprint information; or
set fingerprint information, obtained from the touch operation, of a recognized finger that latest comes into contact with the electronic device as the second fingerprint information; or
set fingerprint information, obtained from the touch operation, of a recognized finger that has a maximum area of contact with the electronic device as the second fingerprint information; or
set fingerprint information, obtained from the touch operation, of a recognized finger that has a minimum area of contact with the electronic device as the second fingerprint information: or
execute instructions to:
obtain a contact moment, a contact area, and an integrity parameter that correspond to fingerprint information obtained from the touch operation, wherein the contact moment is a moment when a finer corresponding to the fingerprint information comes into contact with the electronic device, the contact area is an area in which the finger corresponding to the fingerprint information comes into contact with the electronic device, and the integrity parameter represents an integral degree of the fingerprint information; and
determine the second fingerprint information according to the contact moment, the contact area, and the integrity parameter; and
match the second fingerprint information and the first fingerprint information; and
an output component coupled to the input component and the processor and configured to display the first application in the application switch screen when the second fingerprint information matches the first fingerprint information.

15. The electronic device of claim 14, wherein the output component is further configured to display, in the application switch screen, a second application or the first application on which blurring processing is performed when the second fingerprint information does not match the first fingerprint information, and verification against the first fingerprint information does not need to be performed to run the second application.

16. The electronic device of claim 14, wherein the output component is further configured to display either a screen thumbnail of the first application or basic information of the first application in the application switch screen.

17. The electronic device of claim 14, wherein the input component is further configured to receive a selection instruction of a user, and the processor is further configured to select at least one application as the first application according to the selection instruction.

* * * * *

UNITED STATES PATENT AND TRADEMARK OFFICE
CERTIFICATE OF CORRECTION

PATENT NO. : 10,395,089 B2
APPLICATION NO. : 15/550879
DATED : August 27, 2019
INVENTOR(S) : Xi Huang, Huangwei Wu and Jeijing Huang It is certified that error appears in the above-identified patent and that said Letters Patent is hereby corrected as shown below:

In the Claims

Claim 7, Column 44, Line 39: "firmer" should read "finger"

Claim 7, Column 44, Line 59: "When" should read "when"

Claim 14, Column 46, Line 12: "finer" should read "finger"

Signed and Sealed this
Eighth Day of October, 2019

Andrei Iancu
*Director of the United States Patent and Trademark Office*